US011879032B2

(12) United States Patent
Okkel et al.

(10) Patent No.: US 11,879,032 B2
(45) Date of Patent: Jan. 23, 2024

(54) REACTION PRODUCTS CONTAINING URETHANE GROUPS AND UREA GROUPS

(71) Applicant: BYK—Chemie, GmbH, Wesel (DE)

(72) Inventors: Andreas Okkel, Wesel (DE); Wolfgang Pritschins, Wesel (DE); Michael Bessel, Düsseldorf (DE); Irina Giebelhaus, Cologne (DE); Marcus Meichsner, Kamp-Lintfort (DE); Monika Roch, Dinslaken (DE)

(73) Assignee: BYK-Chemie GmbH, Wesel (DE)

( * ) Notice: Subject to any disclaimer, the term of this patent is extended or adjusted under 35 U.S.C. 154(b) by 0 days.

(21) Appl. No.: 17/726,106

(22) Filed: Apr. 21, 2022

(65) Prior Publication Data

US 2022/0282021 A1  Sep. 8, 2022

Related U.S. Application Data

(63) Continuation of application No. 15/740,624, filed as application No. PCT/EP2016/066360 on Jul. 8, 2016, now abandoned.

(30) Foreign Application Priority Data

Jul. 8, 2015 (EP) .................... 15175928

(51) Int. Cl.
| | | |
|---|---|---|
| C08G 18/10 | (2006.01) | |
| C08G 18/48 | (2006.01) | |
| C08G 18/61 | (2006.01) | |
| C08G 18/76 | (2006.01) | |
| C08G 18/80 | (2006.01) | |
| C08G 18/28 | (2006.01) | |
| C08G 18/32 | (2006.01) | |
| C08G 18/38 | (2006.01) | |
| C08G 18/42 | (2006.01) | |
| C08G 18/63 | (2006.01) | |

(52) U.S. Cl.
CPC ........... *C08G 18/10* (2013.01); *C08G 18/283* (2013.01); *C08G 18/284* (2013.01); *C08G 18/3271* (2013.01); *C08G 18/3275* (2013.01); *C08G 18/3281* (2013.01); *C08G 18/3848* (2013.01); *C08G 18/3851* (2013.01); *C08G 18/4277* (2013.01); *C08G 18/4833* (2013.01); *C08G 18/61* (2013.01); *C08G 18/636* (2013.01); *C08G 18/7621* (2013.01); *C08G 18/8019* (2013.01); *C08G 18/8064* (2013.01); *C08G 18/8067* (2013.01)

(58) Field of Classification Search
CPC ...... C08G 18/10; C08G 18/636; C08G 18/61; C08G 18/7621; C08G 18/8019; C08G 18/4277; C08G 18/3851; C08G 18/3848; C08G 18/3275; C08G 18/4833; C08G 18/3271; C08G 18/284; C08G 18/283; C08G 18/8064; C08G 18/8067; C08G 18/3281

See application file for complete search history.

(56) References Cited

U.S. PATENT DOCUMENTS

| | | | |
|---|---|---|---|
| 4,032,698 | A | 6/1977 | Ashe |
| 4,093,759 | A | 6/1978 | Otsuki et al. |
| 4,101,529 | A | 7/1978 | Ammons |
| 4,647,647 | A | 3/1987 | Haubennestel et al. |
| 4,762,752 | A | 8/1988 | Haubennestel et al. |
| 4,777,195 | A | 10/1988 | Hesse et al. |
| 4,795,796 | A | 1/1989 | Haubennestel et al. |

(Continued)

FOREIGN PATENT DOCUMENTS

| | | |
|---|---|---|
| EP | 0154678 A1 | 9/1985 |
| EP | 0318999 A2 | 6/1989 |

(Continued)

OTHER PUBLICATIONS

International Search Report for Application No. PCT/EP2016/066360 dated Oct. 19, 2016.

(Continued)

*Primary Examiner* — Rabon A Sergent
(74) *Attorney, Agent, or Firm* — Curatolo Sidoti & Trillis Co., LPA; Salvatore A. Sidoti; Floyd Trillis, III

(57) ABSTRACT

The present invention relates to reaction products containing urethane groups and urea groups, containing at least one species of general formula (I), to a method for producing said reaction products, to the use of said reaction products as wetting agents, dispersants, dispersion stabilizers, and/or adhesion promoters, and to compositions that contain the reaction products containing urethane groups and urea groups.

11 Claims, 1 Drawing Sheet

(56) References Cited

U.S. PATENT DOCUMENTS

| | | | |
|---|---|---|---|
| 4,933,417 | A | 6/1990 | Yamamoto et al. |
| 4,942,213 | A | 7/1990 | Haubennestel et al. |
| 6,617,468 | B2 | 9/2003 | Haubennestel et al. |
| 6,875,897 | B1 | 4/2005 | Lange et al. |
| 9,573,103 | B2 | 2/2017 | Gobelt et al. |
| 9,617,371 | B2 | 4/2017 | Leutfeld et al. |
| 2002/0115882 | A1 | 8/2002 | Haubennestel et al. |
| 2012/0226075 | A1 | 9/2012 | Leutfeld et al. |
| 2014/0194537 | A1 | 7/2014 | Gobelt et al. |
| 2016/0083502 | A1 | 3/2016 | Tilak et al. |

FOREIGN PATENT DOCUMENTS

| | | |
|---|---|---|
| EP | 2292675 A1 | 3/2011 |
| WO | 2012175159 A1 | 12/2012 |
| WO | 2017017036 A1 | 2/2017 |

OTHER PUBLICATIONS

Written Opinion for Application No. PCT/EP2016/066360 dated Oct. 19, 2016.
International Preliminary Report on Patentability for Application No. PCT/EP2016/066360 dated Jan. 9, 2018.
A. Gross, et al., Synthesis and Copolymerization of Macromonomers Based on 2-nonyl- and 2-phenyl-2-oxazoline, Macromolecular Chemistry and Physics, Sep. 1996, pp. 2811-2826, vol. 197, Issue 9, Abstract Only.

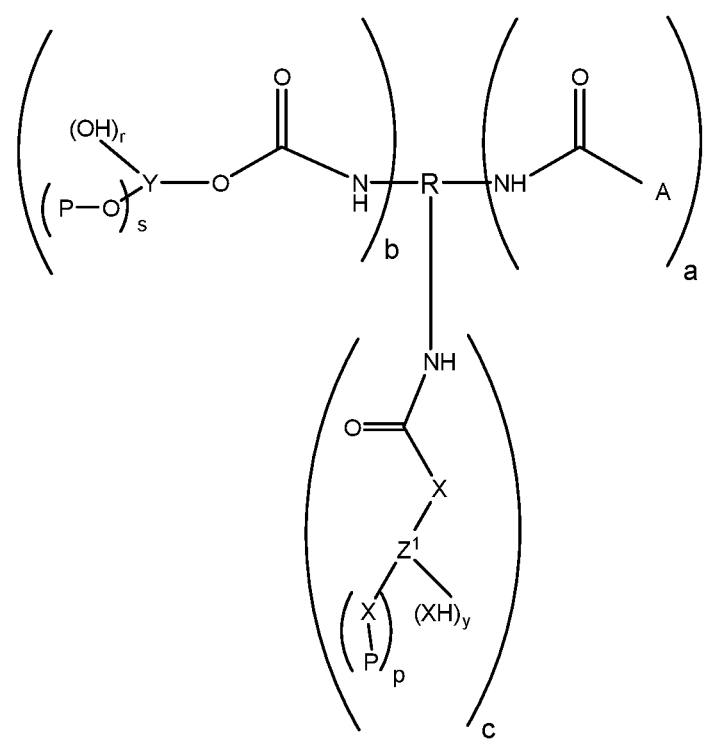
(I)

REACTION PRODUCTS CONTAINING URETHANE GROUPS AND UREA GROUPS

CROSS REFERENCE TO RELATED APPLICATIONS

This application is a continuation of U.S. patent application Ser. No. 15/740,624, filed Dec. 28, 2017, which is a national stage application of International Application No. PCT/EP2016/066360, filed Jul. 8, 2016, which claims priority from European Patent Application No. 15175928.9, filed Jul. 8, 2015, all of which applications are incorporated herein by reference.

The present invention relates to reaction products containing urethane and urea groups, to a process for preparation thereof, to the use thereof as wetting agents, dispersants, dispersion stabilizers and/or adhesion promoters, and to compositions comprising them.

Wetting agents in dissolved or dispersed form in a liquid lower the surface tension or interfacial tension and hence increase the wetting capacity of the liquid. In this way, wetting agents in many cases actually enable any surface wetting at all.

Dispersants are generally suitable for stabilization of solid particles in binders, varnishes, pigment pastes, plastics and plastics mixtures, adhesives and sealants, for reduction of the viscosity of corresponding systems and for improving the flow properties. Dispersion stabilizers are used for stabilization of dispersions that have already been produced.

In order to be able to introduce solids into liquid media, high mechanical forces are required. It is customary to use dispersants to lower the dispersion forces and to keep the total energy input into the system needed for deflocculation of the solid particles as low as possible and hence also the dispersion time as short as possible. Dispersants of this kind are surface-active substances of anionic, cationic and/or uncharged structure. These substances are either applied directly to the solid in a small amount or added to the dispersion medium. A further major factor is that reagglomeration can occur after the dispersion process even after complete deflocculation of the solid agglomerates into primary particles, which partly or completely negates the expenditure on dispersion. Inadequate dispersion or reagglomeration typically results in unwanted effects, such as a rise in viscosity in liquid systems, a drift in the hue and a loss of gloss in varnishes and coatings, and also a reduction in the mechanical strength and material homogeneity in plastics.

Useful wetting agents and dispersants in practice include various types of compound. The particular reason for this is that there exist a high number of different systems based, in particular, on various kinds of binders combined with different particles to be dispersed, such as pigments, fillers and fibers.

WO-A-2012/175159, for example, describes the preparation of specific additive compositions which can be regarded as high-quality wetting agents and dispersants. However, these additive compositions are not considered to be the optimal and complete solution for many dispersion tasks, especially owing to limited universality with respect to the solids to be dispersed.

Adhesion promoters are all components that lead to bond strength between materials to be combined with one another, for example coatings on various substrates such as metal, plastic, wood and glass. In quite general terms, it is known that there is a structural relationship between adhesion promoters and wetting agents and dispersants, in such a way that adhesion promoters can correspond structurally to a wetting agent and dispersant having no sterically stabilizing side chains.

It was thus an object of the present invention to provide high-quality products usable with maximum universality that are suitable as wetting agents and/or dispersants and/or dispersion stabilizers and/or as adhesion promoters. More particularly, highly effective wetting agents are to be found for carbon blacks and organic pigments, which enable lowering of viscosity in the process of dispersion, constantly low viscosity of the pigment dispersion in the course of storage, and excellent coloristic properties (gloss, transparency, color depth) for pigmented coatings.

BRIEF DESCRIPTION OF THE DRAWING

FIG. 1 shows the general chemical formula of the reaction products containing urethane and urea groups of the present invention.

The object was achieved by the provision of reaction products containing urethane and urea groups, comprising at least one species of the general formula (I) as shown in FIG. 1,

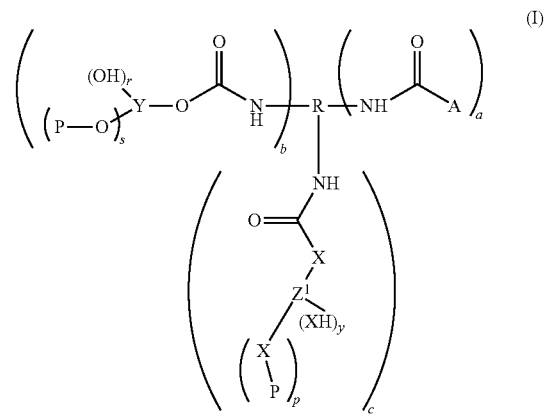

where $a+b+c=x$,
$r+s=q-1$
$p+y=w-1$
$x$ is an integer from 2 to 10,
$a$ is an integer from 1 to 9,
$b$ is an integer from 1 to 9,
$c$ is an integer from 0 to 8,
$q$ is an integer from 1 to 5,
$r$ is an integer from 0 to 4,
$s$ is an integer from 0 to 4,
$w$ is an integer from 1 to 10,
$p$ is an integer from 0 to 9,
$y$ is an integer from 0 to 9, and
R is the organic radical of a corresponding polyisocyanate $R(NCO)_x$, R is a branched or unbranched, saturated or unsaturated organic radical having 1 to 150 carbon atoms and does not contain any free isocyanate groups,
the Y radical(s) is/are independently the organic radical(s) of a corresponding alcohol $Y(OH)_q$ where q is an integer from 1 to 5 and Y is a branched or unbranched, saturated or unsaturated organic radical having 1 to 1000 carbon atoms,
the X group(s) is/are independently O, NH and/or $NZ^2$ and
the XH group(s) is/are independently a hydroxyl group OH, a primary amino group $NH_2$ and/or a secondary amino group $NHZ^2$ where the $Z^2$ radical(s) is/are independently a branched or unbranched, saturated or unsaturated organic radical $G(XH)_j(XP)_i$ where i+j=k,
k is an integer from 0 to 9,
j is an integer from 0 to 9,
i is an integer from 0 to 9, and
the G radical is a branched or unbranched, saturated or unsaturated organic radical, and
the A radical(s) is/are independently a radical of the general formula (II)

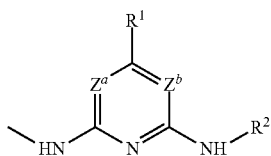

(II)

where
the $R^1$ radical is H or $NH_2$ or a branched or unbranched, saturated or unsaturated organic radical having 1 to 25 carbon atoms or, if $Z^b$ is C and $R^2$ is —CH=N—, where the nitrogen atom of the $R^2$ radical is bonded directly to $Z^b$ to form a 5-membered ring, $R^1$ is OH,
the $Z^a$ group is CH or N or $CR^3$ where the $R^3$ radical is a branched or unbranched, saturated or unsaturated organic radical having 1 to 18 carbon atoms,
the $Z^b$ group is CH or N or, if $R^1$ is OH, $Z^b$ is C,
the $R^2$ radical is H or, if $R^1$ is OH, $R^2$ is —CH=N—,
the $Z^1$ radical(s) is/are independently the organic radical of a corresponding species of the general formula (III)

$(HX)_y—Z^1—(XH)_{p+1}$ (III)

where y+(p+1)=w, and
w is an integer from 1 to 10,
p is an integer from 0 to 9,
y is an integer from 0 to 9, and
$Z^1$ is a branched or unbranched, saturated or unsaturated organic radical containing 1 to 150 carbon atoms,
the P radical(s) is/are independently a radical of the general formula (IVa)

—(CO)—NH—R-$(Q)_{x-1}$ (IVa)

where
the Q radical(s) is/are independently a radical

—NH—(CO)-A or

—NH—(CO)—X—$Z^1(XH)_y(X—U)_p$ or

—NH—(CO)—O—$Y(OH)_r(O—U)_s$ where
the U radical(s) is/are independently a radical of the general formula (IVb)

—(CO)—NH—R—$(V)_{x-1}$ (IVb)

where
the V radical(s) is/are independently a radical

—NH—(CO)-A or

—NH—(CO)—X—$Z^1(XH)_y$ or

—NH—(CO)—O—$Y(OH)_r$.

Preferably, the "reaction product containing urethane and urea groups" comprises one or more species of the general formula (I) as main reaction product(s), meaning that the amount of the species of the general formula (I), the reaction product containing urea and urethane groups, is at least 40% by weight, more preferably at least 60% by weight and especially preferably at least 90% by weight, based on the total weight of the reaction product containing urethane and urea groups. Most preferably, the reaction product containing urethane and urea groups consists essentially of one or more species of the general formula (I). Owing to the merely commercial purity levels of the reactants and/or side reactions that possibly occur in the preparation of the reaction products containing urethane and urea groups, "essentially consisting of" is understood herein to mean a content of species of the formula (I) in the total weight of the reaction product containing urethane and urea groups of at least 95% by weight.

The term "species" here encompasses both compounds having a specific molecular weight and species that contain polymeric radicals and hence have a weight-average and a number-average molecular weight.

The "reaction products containing urethane and urea groups" may in the simplest case be molecularly homogeneous products when exclusively molecularly homogeneous, essentially chemically pure compounds $Y—(OH)_q$, $R(NCO)_x$, $Z^1—(HX)_w$ and a species for introducing the A radical are used for preparation thereof, in which, consequently, Y is non-polymeric, all Y are identical, all R are identical, all X are identical, all A are identical and all $Z^1$ are identical. The simplest molecularly homogeneous products of the invention containing at least one species of general formula (I) arise in the case when x assumes the value of 2 and, consequently, a and b each assume the value of 1.

However, the "reaction products containing urethane and urea groups" may also be molecularly inhomogeneous products. This is the case, for example, when the Y radical is polymeric in nature and hence per se introduces molecular inhomogeneity into the products.

The "reaction products containing urethane and urea groups" may, finally, also be mixtures when the "reaction products containing urethane and urea groups" contain different species of general formula (I). This is the case, for example, when the species differ in the variables a and/or b and/or c. In addition, it is also possible, for example, that the reactants for preparation of the reaction products containing urethane and urea groups contain different Y and/or R and/or A and/or $Z^1$ radicals. The mixtures may be mixtures of chemically homogeneous reaction products containing urethane and urea groups that contain polymeric radicals, or mixtures of one or more chemically homogeneous reaction products containing urethane and urea groups with one or more reaction products containing urethane and urea groups and polymeric radicals.

In the context of this invention, the terms "hydroxyl group" and "primary amino group" and "secondary amino group" should be understood in the sense of their general meaning. This means more particularly that they are present as an independent functional group and not part of an overall further functional group. Thus, in the context of this invention, the OH functionality of a carboxyl group is not a hydroxyl functionality.

Species of the General Formula (I)

The inventive reaction products containing urethane and urea groups comprise at least one species of the general formula (I)

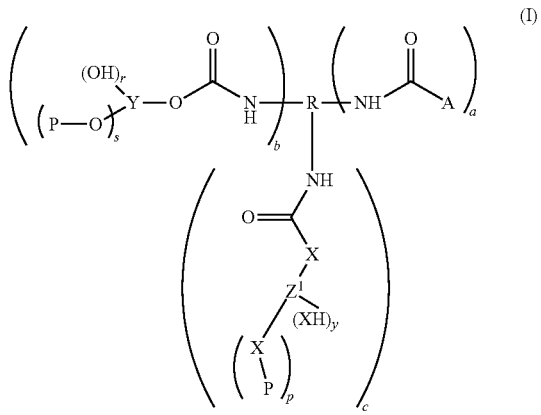

(I)

where all the variables in the aforementioned general formula (I) are as defined above.

It is essential to the invention that the species of the general formula (I) contain at least one —NH—(CO)-A radical, which means that the species of the general formula (I) has at least one urea group, and at least one NH—(CO)—O—Y—(OH)$_r$(PO)$_s$ radical, by virtue of which the species of the general formula (I) has at least one urethane group. In addition, the species of general formula (I) may have one or more —NH—(CO)—X—Z$^1$—(XP)$_p$(XH)$_y$ radicals, by means of which further urethane and/or urea groups are introduced into the species of the general formula (I) depending on the X group(s).

Overall, the sum total a+b+c of all radicals bonded to R in the species of the general formula (I) is limited to the value of x, where x is an integer from 2 to 10. The R radical is the organic radical of a corresponding polyisocyanate R(NCO)$_x$. This means that the number of radicals bonded to R results from the number of isocyanate groups in the corresponding polyisocyanate R(NCO)$_x$. It is essential to the invention that the R radical does not contain any free isocyanate groups, and it is also essential to the invention that all x free isocyanate groups of the polyisocyanate R(NCO)$_x$ have been converted to urethane and urea groups, such that the reaction product containing urethane and urea groups or the species of the general formula (I) present therein does not have any free isocyanate groups.

The term "free isocyanate group" should be understood in the sense of its general definition and describes isocyanate groups that are in free form and can be used for direct reaction with alcohols and/or primary and/or secondary amino groups. This means more particularly that uretdione groups and isocyanurate groups or what are called blocked isocyanate groups do not constitute free isocyanate groups.

It is preferable that x in the general formula (I) is an integer from 2 to 7, more preferably from 2 to 5, especially preferably of 2 or 3. Most preferably, x is the value of 2.

It is further preferable that a is an integer from 1 to 6, more preferably an integer from 1 to 4, especially preferably of 1 or 2.

It is further preferable that b is an integer from 1 to 6, more preferably an integer from 1 to 4, especially preferably of 1 or 2.

It is especially preferable that x is an integer from 2 to 7, a is an integer from 1 to 6 and b is an integer from 1 to 6. Very particular preference is given to the combination in which x assumes the value of 2, a is 1 and b is 1. This means that the species of the general formula (I) has a —NH—(CO)-A radical and a —NH—(CO)—O—Y—(OH)$_r$(PO)$_s$ radical. In this particularly preferred embodiment, the species of the general formula (I) does not contain any —NH—(CO)—X—Z$^1$—(XP)$_p$(XH)$_y$ radicals.

In all other cases in which x assumes a value greater than 2, the species, in addition to the —NH—(CO)-A and —NH—(CO)—O—Y—(OH)$_r$(PO)$_s$ radicals that are essential to the invention, may contain one or more —NH—(CO)—X—Z$^1$—(XP)$_p$(XH)$_y$ radicals.

In principle, reactive OH or XH groups bonded to Y and Z$^1$ can be used as attachment points in order to construct larger structures through reactions with further polyisocyanates R(NCO)$_x$. The variables p and s indicate the number of OH or XH groups that have reacted with a free isocyanate group of a polyisocyanate R(NCO)$_x$. The simplest structures of the species of the general formula (I) arise in the cases where the variables s and p assume the value of 0. This case is also referred to hereinafter as a species of the general formula (I) with a 0th generation structure. It is preferable that the variable p is an integer from 0 to 3, preferably of 0 or 1. It is further preferable that s is an integer from 0 to 3, preferably of 0 or 1. In principle, the OH groups bonded to Y and the XH groups bonded to Z$^1$ are capable of reacting reactions with a free isocyanate group of a further polyisocyanate R(NCO)$_x$ to form urethane and urea groups. The remaining free isocyanate groups of the polyisocyanate R(NCO)$_x$ can in turn react with the further reactants in the reaction mixture. Thus, the reactive groups bonded to Y and/or Z$^1$ serve as attachment points for construction of larger structures. This case is referred to as a 1st generation structure. Species of the general formula (I) having a 1st generation structure can in turn enter into the reactions described above, so as then to result in formation of 2nd generation structures. It is essential to the invention that the at least one species of the general formula (I) has no more than a 2nd generation structure in the reaction product containing urethane and urea groups.

Preferably, the species of the general formula (I) have a number-average molecular weight in the range from 253 to 250 000 g/mol, more preferably from 500 to 200 000 g/mol, especially preferably from 800 to 150 000 g/mol, most preferably from 1000 to 100 000 g/mol.

Polyisocyanate R(NCO)$_x$

The R radical corresponding to the polyisocyanate R(NCO)$_x$ is a branched or unbranched, saturated or unsaturated organic radical having 1 to 150 carbon atoms. The organic R radical may additionally contain uretdione and/or urethane groups, but ones that do not react under the given conditions. Preferably, the organic R radical is in the form of a hydrocarbyl radical, more preferably of an arylene group, of an alkylarylene group and/or of an acyclic, cyclic, branched or unbranched alkylene group.

It is essential to the invention that the R radical does not contain any free isocyanate groups. Preferred polyisocyanates R(NCO)$_x$ are those in which x is an integer from 2 to 7. Preference is further given to polyisocyanates in which x is an integer from 2 to 5, more preferably of 2 or 3. Very particular preference is given to diisocyanates R(NCO)$_2$. Among the diisocyanates, it is further preferable that the diisocyanate R(NCO)$_2$ has two isocyanate groups of different reactivity. Preferred diisocyanates having groups of different reactivity are toluene 2,4-diisocyanate and isophorone diisocyanate.

Polyisocyanates R(NCO)$_x$ in which x is an integer from 2 to 10 are known in principle from the prior art. For instance, EP 0154678 A1 describes corresponding polyisocyanates in which x assumes a value of greater than 2.

Examples of such polyisocyanates are those that can be obtained by addition of diisocyanates onto polyols. These are available, for example, under the Desmodur L trade name. Further polyisocyanates are obtainable by biuret reactions from diisocyanates. These are available, for example, under the Desmodur N trade name. Additionally useful are polyisocyanates having an isocyanurate base structure that are obtained by cyclization of diisocyanates. Corresponding products are available under the Desmodur HL, Desmodur IL, Polurene KC or Polurene HR trade names. In addition, it is possible to use tolylene diisocyanate-isophorone diisocyanate isocyanurate or trimeric isophorone diisocyanate.

As already set out above, the abovementioned polyisocyanates are commercial products that frequently do not have their underlying chemical formula in pure form, but are mixtures of polyisocyanates having similar structure.

Polyisocyanates $R(NCO)_x$ in which x assumes the value of 2 are covered by the umbrella term of "polyisocyanates" in the context of this invention, but are also referred to more specifically as diisocyanates.

Diisocyanates of this kind are, for example, 1,4-diisocyanatobutane, hexamethylene diisocyanate (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,3- and 1,4-bis(isocyanatomethyl)cyclohexane, 1-isocyanato-3,3,5-trimethyl-5-isocyanatomethylcyclohexane (isophorone diisocyanate, IPDI), 4,4'-diisocyanato-dicyclohexylmethane (H12MDI), tolylene diisocyanate (TDI), 1-isocyanato-1-methyl-4(3)isocyanatomethylcyclohexane, diphenylmethane diisocyanate (MDI), bis(isocyanatomethyl)norbornane and 1,3- and 1,4-bis(2-isocyanatoprop-2-yl)benzene (TMXDI) or mixtures of such diisocyanates. The monomeric diisocyanates mentioned may be used as such or in the form of their oligomeric or polymeric diisocyanate-functional derivatives having uretdione and/or urethane groups.

Examples of diisocyanates available as commercial products are Desmodur T100 (100% 2,4-TDI, Bayer AG), Desmodur T80 (80% 2,4-TDI, 20% 2,6-TDI, Bayer AG), Desmodur T65 (65% 2,4-TDI, 35% 2,6-TDI, Bayer AG), Desmodur N3400 (aliphatic HDI uretdione, Bayer AG), Thanecure T9 (aromatic TDI uretdione, TSE Industries), Crelan VP LS 2147 and Crelan VP LS 2347 (aliphatic IDPI uretdiones, Bayer AG). Preparation of the inventive reaction products containing urethane and urea groups can be accomplished using one or more monomeric, oligomeric or polymeric diisocyanates.

Alcohol $Y-(OH)_q$

The Y radical(s) of the general formula (I) is/are independently the organic radical(s) of a corresponding alcohol $Y-(OH)_q$ where q is an integer from 1 to 5 and Y is a branched or unbranched, saturated or unsaturated organic radical having 1 to 1000 carbon atoms.

The organic Y radical may have additional heteroatoms such as O, S, Si and/or N, or contain ether, urethane, carbonate, amide, urea and/or ester groups. However, the hydroxyl groups, primary amino groups and secondary amino groups that are extremely reactive toward isocyanate groups must not be present in Y. Optionally, in the Y groups, hydrogen may be replaced by halogen (for example fluorine and/or chlorine). The Y radical may bear further groups, such as C=C double bonds, which are inert in the formation of the addition product. Any ester, ether, urethane, carbonate and/or siloxane groups present may be present in block structure (for example poly(ethylene oxide block-propylene oxide block-epsilon-caprolactone), form a gradient or else be in a random arrangement.

Preferably, Y contains at least one polyether radical, polyester radical, hydrocarbyl radical and/or polysiloxane radical.

Preferably, the Y radical is the organic radical of an alcohol $Y-(OH)_q$ with q from 1 to 4, more preferably from 1 to 3. More preferably, the Y radical is the organic radical of an alcohol $Y-(OH)_q$ where q is 1 or 2. Most preferably, Y is the organic radical of a monoalcohol $Y-OH$ with q=1.

The parameter q of the alcohol $Y-(OH)_q$ can affect the structure of the general formula (I) present in the reaction product of the invention containing urethane and urea groups. In general, alcohols $Y-(OH)_q$ with q>1 especially improve the anti-settling characteristics, whereas alcohols having low q values, especially with q=1, make an enhanced contribution to deflocculation characteristics.

In the preparation of the reaction products containing urethane and urea groups, comprising at least one species of the species of the general formula (I), it is possible to use mixtures of different alcohols $Y-(OH)_q$ which differ by their q value. If corresponding mixtures of different alcohols $Y-(OH)_q$ with different q values are used, it is preferable that at least 40%, further preferably 50% and more preferably 60% of the alcohols $Y-(OH)_q$ have a value of q of 1.

Y as Ether Radical or Polyether Radical:

As $Y-(OH)_q$ it is also possible to use mono-, di- or polyhydroxy polyethers. These can be obtained, for example, by alkoxylation of hydroxy-functional starter components $T-(OH)_q$ with q=1 to 5. In principle, all $Y-(OH)_q$ components described are useful as starter component $T-(OH)_q$. For preparation, for example, alkanols, cycloalkanols or phenols can be reacted with alkylene oxides such as ethylene oxide, propylene oxide, butylene oxide, styrene oxide, aliphatic or aromatic glycidyl ethers such as isopropyl glycidyl ether, butyl glycidyl ether, allyl glycidyl ether, 2-ethylhexyl glycidyl ether, cresyl glycidyl ether and phenyl glycidyl ether. It is also possible to use mixtures of these raw materials. In the case of mixed polyethers, these may be arranged randomly, in gradient form or in blocks.

These polyethers preferably have a number-average molecular weight ($M_n$) in the range from about 100 to 25 000, more preferably from 150 to 15 000 and particularly typically from 200 to 10 000 g/mol.

Preference is given to polyethers based on ethylene oxide, propylene oxide and mixtures thereof.

Examples are hydroxy-functional vinyl compounds, such as hydroxybutyl vinyl ether, monohydroxy-functional polyoxyalkylene monoalcohols, such as allyl polyethers (e.g. Polyglycol A 350, Polyglycol A 500, Polyglycol A 1100, Polyglycol A 11-4, Polyglycol A 20-10 or Polyglycol A 20-20 from Clariant AG or Pluriol® A 010 R, Pluriol® A 11 RE, Pluriol® A 13 R, Pluriol® A 22 R or Pluriol® A 23 R from BASF AG), vinyl polyethers (such as Polyglycol V 500, Polyglycol V 1100 or Polyglycol V 5500 from Clariant AG), methanol-started polyoxyethylene monoalcohols (such as Pluriol® A 350 E, Pluriol® A 500 E, Pluriol® A 750 E, Pluriol® A 1020 E, Pluriol® A 2000 E or Pluriol® A 5010 E from BASF AG), alkanol-started polyoxypropylene monoalcohols (for example Polyglycol B01/20, Polyglycol B01/40, Polyglycol B01/80, Polyglycol B01/120 or Polyglycol B01/240 from Clariant AG or Pluriol® A 1350 P or Pluriol® A 2000 P from BASF AG) and polyalkoxylates that have been started with various fatty alcohols and have a variable degree of alkoxylation (known under the Lutensol® A, Lutensol® AT, Lutensol® AO, Lutensol® TO, Lutensol®

XP, Lutensol® XL, Lutensol® AP and Lutensol® ON trade names from BASF SE). Preference is given to using polyoxyalkylene monoalcohols containing ethylene oxide and/or propylene oxide and/or butylene oxide groups and optionally modified with styrene oxide, phenyl glycidyl ether or cresyl glycidyl ether. Particular preference is given to the use of polyoxyalkylene monoalcohols (such as Polyglycol B 11/50, Polyglycol B 11/70, Polyglycol B 11/100, Polyglycol B 11/150, Polyglycol B 11/300 or Polyglycol B 11/700 from Clariant AG, Pluriol® A 1000 PE, Pluriol® A 1320 PE, or Pluriol® A 2000 PE from BASF AG or Terralox WA 110 from DOW Chemicals), which are butanol-started polyoxyalkylenes formed from ethylene oxide and propylene oxide with a terminal OH group.

In general, Y contains 1 to 450 ether oxygen atoms which are preferably present in groups having ether oxygen atoms that are derived from polytetrahydrofuran, polyoxetanes and/or polyoxiranes.

Preferably, Y contains 3 to 400 ether oxygen atoms, where at least 50 mol %, preferably at least 80 mol %, of the ether oxygen atoms are present in ethylene oxide and/or polypropylene oxide structural units.

Y as hydrocarbyl radical:

The hydrocarbyl radicals are preferably in the form of an aryl radical, of a branched or unbranched aralkyl radical and/or of an acyclic, cyclic branched or unbranched alkyl radical. It is also possible to use mixtures of such compounds, i.e. at least two different compounds $Y—(OH)_q$. The aliphatic or araliphatic compounds $Y—(OH)_q$ may be in straight-chain or branched, saturated or unsaturated form. Saturated species are preferred.

Examples of $Y—(OH)_q$ with hydrocarbyl radicals, in the case that q is 1, are methanol, ethanol, butanol, ethylhexanol, decanol, isotridecyl alcohol, lauryl alcohol, stearyl alcohol, isobornyl alcohol, benzyl alcohol, propargyl alcohol, oleyl alcohol, linoleyl alcohol, oxo alcohols, neopentyl alcohol, cyclohexanol, fatty alcohols, alkylphenols, alkylnaphthols, phenylethanol.

Examples of $Y(—OH)_q$, with hydrocarbyl radicals, if q is greater than 1, are butanediol, hexanediol, cyclohexanedimethanol, neopentyl glycol, ethylene glycol, glycerol and trimethylolpropane.

In addition, $Y—(OH)_q$ may be polyolefin polyols or monools, such as nonhydrogenated, partly hydrogenated and/or fully hydrogenated polybutadienes, non-hydrogenated, partly hydrogenated and/or fully hydrogenated polyisoprenes, polyisobutylenes, polypropylenes or ethylene/butylene copolymers. These compounds are known. For example, the route to hydroxy-functional polyisobutylenes is described in U.S. Pat. No. 6,875,897.

Y as Ester Radical or Polyester Radical:

As $Y—(OH)_q$ it is also possible to use monohydroxy monoesters and mono-, di- or polyhydroxy polyesters.

Hydroxy-functional acrylates or methacrylates, such as hydroxyethyl acrylate, hydroxyethyl methacrylate, hydroxybutyl (meth)acrylate, are examples of suitable monohydroxy monoesters.

Polyesters can be prepared, for example, by reaction of dicarboxylic acids and the esterifiable derivatives thereof, such as anhydrides, acid chlorides or dialkyl esters (such as dimethyl esters or diethyl esters) by reaction with diols and mono-, di- or trifunctional starter components. The formation of dihydroxy polyesters can be suppressed if required through use of appropriately stoichiometric amounts of monohydroxy compounds. The esterification can be conducted in neat form or else by azeotropic esterification in the presence of an entraining agent. Examples of dicarboxylic acids are succinic acid, maleic acid, fumaric acid, glutaric acid, adipic acid, sebacic acid, pimelic acid, phthalic acid or dimerized fatty acids, and the isomers and hydrogenation products thereof. Examples of corresponding diols are: ethylene glycol, propane-1,2-diol, propane-1,3-diol, butane-1,4-diol, hexane-1,6-diol, neopentyl glycol, cis-1,2-cyclohexanedimethanol, trans-1,2-cyclohexanedimethanol, and polyglycols based on ethylene glycol and/or propylene glycol.

Preferred polyesters for use as $Y—(OH)_q$ are those which can be obtained by polycondensation of one or more optionally alkyl-substituted hydroxycarboxylic acids and/or ring-opening polymerization of the corresponding lactones such as propiolactone, valerolactone, butyrolactone, caprolactone and/or substituted lactones by means of a mono-, di- or trihydroxy starter component (as described in U.S. Pat. No. 4,647,647). Preferably, these have a number-average molecular weight $M_n$ of 150 to 5000 g/mol. Usable starter components $T-(OH)_q$ are in principle also all other compounds listed as $Y—(OH)_q$. It is also possible in each case to use mixtures of the aforementioned compounds. Lactone polymerization is conducted by known processes, initiated, for example, by titanates, p-toluenesulfonic acid or dibutyltin dilaurate, at temperatures of, for instance, 70° C. to 180° C. Particular preference is given to polyesters based on epsilon-caprolactone, optionally in combination with delta-valerolactone.

Y as Urethane Radical or Polyurethane Radical:

As $Y—(OH)_q$ it is also possible to use polyurethanes, polyether-polyurethanes, polyester-polyurethanes and/or polyether-polyester-polyurethanes, which can be obtained by addition reaction of diisocyanates with dihydroxyl compounds in the presence of mono-, di- or trifunctional starter components. Hydroxyl compounds used to form the compounds $Y—(OH)_q$ containing urethane groups are preferably diols having 2 to 12 carbon atoms, polyoxyalkylene glycols and dihydroxy-functional polyesters.

Y as Polycarbonate Radical:

The Y radical may also contain carbonate groups as obtained by known reactions with open-chain and/or cyclic carbonates. Suitable examples are linear polyesters or polycarbonatediols that have been modified with carbonates, as used in polyurethane production. Examples are described in U.S. Pat. No. 4,101,529. Suitable carbonates are, for example, aliphatic, cycloaliphatic, araliphatic and/or aromatic carbonic esters, such as dialkyl carbonates, e.g. dimethyl carbonate, diethyl carbonate or diphenyl carbonate, catechol carbonate or cyclic alkylene carbonates. Particularly suitable are cyclic alkylene carbonates having 5- or 6-membered rings, which may optionally be substituted. Preferred substituents are aliphatic, cycloaliphatic and/or aromatic groups having up to 30 carbon atoms. Examples of suitable cyclic alkylene carbonates are ethylene carbonate, propylene carbonate, glycerol carbonate, trimethylene carbonate, 4-methyltrimethylene carbonate, 5-methyltrimethylene carbonate, 5,5-dimethyltrimethylene carbonate, 5,5-diethyltrimethylene carbonate or 5-methyl-5-propyltrimethylene carbonate.

Y as Polyoxazoline Radical:

It is also possible for hydroxy-functional poly-2-alkyl-2-oxazolines or poly-2-alkyl-2-oxazines to function as $Y—(OH)_q$. Preference is given to using monohydroxy-functional compounds. Poly-2-alkyl-2-oxazolines or poly-2-alkyl-2-oxazines are obtained by cationic, ring-opening polymerization of 2-alkyl-2-oxazolines or 2-alkyl-2-oxazines with initiators such as para-toluenesulfonic acid, methyl tosylate or methyl triflate. The oxazolinium or oxazinium end groups that result from the living cationic polymerization mechanism can be converted to the more stable hydroxyamides by alkaline hydrolysis via amino ester end groups. An alternative route for preparation of mono-hydroxy-functional poly-2-alkyl-2-oxazolines or poly-2-alkyl-2-oxazines is polymerization with 2-(4-hydroxyphenyl)-N-methyl-2-oxazolinium trifluoromethanesulfonate as the initiating species (A. Gross, G. Maier, O. Nuyken, Macromol. Chem. Phys. 197, 2811-2826 (1996)). Through choice of the alkyl substituent, it is possible to control the compatibility; for example, poly-2-ethyl-2-oxazoline is suitable for highly polar systems by virtue of its water solubility, while poly-2-lauryl-2-oxazoline, for example, is compatible in nonpolar systems. If block copolymers are formed from 2-ethyl-2-oxazoline and 2-lauryl-2-oxazoline, the polymers feature particularly broad compatibility. Poly-2-alkyl-2-oxazolines or poly-2-alkyl-2-oxazines of this kind usually have a number-average molecular weight $M_n$ of 300 to 20 000 g/mol, preferably of 500 to 10 000 g/mol. Among other compounds, it is possible to use various different 2-oxazolines which may possibly have additional functional groups. Species of this kind are, for example, corresponding fatty acid-based 2-oxazolines.

Y as OH-Functional Polymer of Ethylenically Unsaturated Compounds:

As $Y—(OH)_q$ it is also possible to use OH-functional polymers of ethnically unsaturated monomers. The OH functions can be introduced in a known manner via hydroxy-functional ethylenically unsaturated monomers, via hydroxy-functional initiators or via hydroxy-functional chain transfer agents, for example in free-radical polymerization. Particularly high selectivities in relation to the hydroxy functionality can be achieved by controlled or living polymerization methods, for example ATRP, NMP, RAFT or anionic polymerization. Preference is given to monohydroxy-functional polyacrylic esters or polymethacrylic esters. Compounds of this kind have already been used in this field of industry for preparation of other dispersants, as described in U.S. Pat. No. 4,032,698 or in EP 318 999. For example, monohydroxy-functional polyacrylate macromers such as Actflow UMM 1001 from Soken Chemical & Engineering Co. are available. These polyacrylates usually have a number-average molecular weight $M_n$ of 300 to 20 000 g/mol, preferably usually from 500 to 10 000 g/mol. These may be arranged in a block structure or else randomly or form a gradient.

Examples of OH-functional ethylenically unsaturated monomers are hydroxyalkyl (meth)acrylates of straight-chain, branched or cycloaliphatic diols having 2 to 36 carbon atoms, such as 3-hydroxypropyl methacrylate, 3,4-dihydroxybutyl monomethacrylate, 2-hydroxyethyl (meth)acrylate, 4-hydroxybutyl (meth)acrylate, 2-hydroxypropyl methacrylate, 2,5-dimethylhexane-1,6-diol monomethacrylate; caprolactone- and/or valerolactone-modified hydroxyalkyl (meth)acrylates (where the hydroxy (meth)acrylates are preferably derived from straight-chain, branched or cycloaliphatic diols having 2 to 8 carbon atoms); OH-functional poly(ethylene glycol)(meth)acrylate and OH-functional poly(propylene glycol)(meth)acrylate.

Examples of further ethylenically unsaturated monomers are alkyl (meth)acrylates of straight-chain, branched or cycloaliphatic alcohols having 1 to 22 carbon atoms, such as methyl (meth)acrylate, ethyl (meth)acrylate, n-butyl (meth)acrylate, i-butyl (meth)acrylate, t-butyl (meth)acrylate, lauryl (meth)acrylate, 2-ethylhexyl (meth)acrylate, stearyl (meth)acrylate, cyclohexyl (meth)acrylate, isobornyl (meth) acrylate and t-butyl (meth)acrylate; aralkyl (meth)acrylates such as benzyl methacrylate and aryl (meth)acrylates such as phenyl acrylate (where the aryl radicals may each be unsubstituted or up to tetrasubstituted), such as 4-nitrophenyl methacrylate;

mono(meth)acrylates of ethers, polyethylene glycols, polypropylene glycols or mixed polyethylene/propylene glycols having 5 to 80 carbon atoms, such as tetrahydrofurfuryl methacrylate, methoxyethoxyethyl methacrylate, 1-butoxypropyl methacrylate, cyclohexyloxymethyl methacrylate, methoxymethoxyethyl methacrylate, benzyloxymethyl methacrylate, furfuryl methacrylate, 2-butoxyethyl methacrylate, 2-ethoxyethyl methacrylate, allyloxymethyl methacrylate, 1-ethoxybutyl methacrylate, 1-ethoxyethyl methacrylate, ethoxymethyl methacrylate, poly(ethylene glycol) methyl ether (meth)acrylate, poly(propylene glycol) methyl ether (meth)acrylate; tertiary am inoalkyl (meth)acrylates, such as N,N-dimethylaminoethyl (meth)acrylate, 2-trimethylammonioethyl methacrylate chloride and N,N-dimethylaminopropyl (meth)acrylate; (meth)acrylates of halogenated alcohols, such as perfluoroalkyl (meth)acrylates having 6 to 20 carbon atoms; styrene and substituted styrenes, such as 4-methylstyrene, methacrylonitrile and acrylonitrile;

ethylenically unsaturated heterocycles, for example 4-vinylpyridine and 1-[2-(methacryloyloxy)ethyl]-2-imidazolidinone;

vinyl esters of carboxylic acids having 1 to 20 carbon atoms, such as vinyl acetate; maleimide, N-phenylmaleimide and N-substituted maleimides with straight-chain, branched or cycloaliphatic alkyl groups having 1 to 22 carbon atoms, such as N-ethylmaleimide and N-octylmaleimide; (meth) acrylamide; N-alkyl- and N,N-dialkyl-substituted acrylamides having straight-chain, branched or cycloaliphatic alkyl groups having 1 to 22 carbon atoms, such as N-(t-butyl)acrylamide and N,N-dimethylacrylamide.

Preferred non-OH-functional monomers are alkyl (meth) acrylates, aryl (meth)acrylates, aralkyl (meth)acrylates and styrene.

Y as Polysiloxane Radical:

As $Y—(OH)_q$ it is also possible to use mono- or polyhydroxy-functional polysiloxanes. The polysiloxanes can preferably be described by the following general formula:

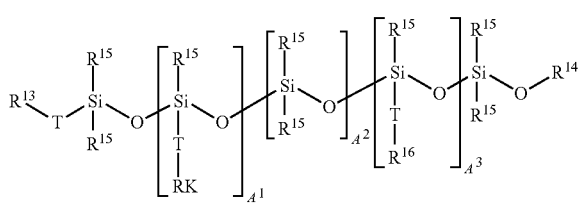

with

T=C1-C14-alkylene,

RK=unbranched polyether radical formed from alkylene oxide units having 1-6 carbon atoms, and/or aliphatic and/or cycloaliphatic and/or aromatic polyester radical having a weight-average molecular weight between 200 and 4000 g/mol, $R^{13}$ and $R^{14}$ are each independently represented by
$C_1$-$C_{14}$-alkyl, -aryl or -aralkyl, —O($C_1$-$C_{14}$-alkyl, -aryl or -aralkyl), —OCO($C_1$-$C_{14}$-alkyl, -aryl or -aralkyl), —O—CO—O($C_1$-$C_{14}$-alkyl, -aryl or -aralkyl), —OSO$_2$($C_1$-$C_{14}$-alkyl, -aryl or -aralkyl), —H, —Cl, —F, —OH, —R, —RK, $R^{15}$=$C_1$-$C_{14}$-alkyl, -aryl or -aralkyl,
$R^{16}$=polyhydroxy-functional branched polyglycidol polyether radical consisting of or comprising a branched polyglycidol group,
$A^1$=0-20, preferably 1-15, more preferably 1-8,
$A^2$=2-300, preferably 10-200, more preferably 15-100, and
$A^3$=0-20, preferably 1-15, more preferably 1-8,
where, when $A^3$=0, $R^{14}$=$R^{16}$ and/or $R^{13}$=$R^{16}$. When the —[$SiR^{15}$($Z$—$R^{16}$)]—O— unit is present, i.e. $A^3$ is at least 1, it is possible that $R^{13}$ and $R^{14}$ are different than $R^{16}$.

The polysiloxane radicals may also take the form of organomodified polysiloxane radicals.

The A Radical of the General Formula (II)

It is essential to the invention that the reaction product containing urethane and urea groups, comprising at least one species of general formula (I), contains at least one A radical therein. The A radical(s) in the general formula (I) is/are independently a radical of the general formula (II)

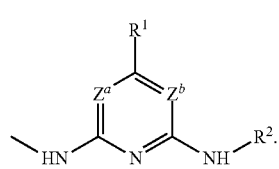

(II)

The $R^1$ radical is H or $NH_2$ or a branched or unbranched, saturated or unsaturated organic radical having 1 to 25 carbon atoms or, if $Z^b$ is C and $R^2$ is —CH=N—, where the nitrogen atom of the $R^2$ radical is bonded directly to $Z^b$ to form a 5-membered ring, $R^1$ is OH.

Preferably, $R^1$ is H or a branched or unbranched, saturated or unsaturated organic radical having 1 to 25, more preferably 1 to 18, especially preferably 1 to 10 and most preferably 1 to 6 carbon atoms. More preferably, the $R^1$ radical is H or a $C_1$- to $C_6$-alkyl radical or a phenyl radical. If $R^1$ is OH, this means that the correspondingly tautomeric resonance structural formula is also covered thereby.

The $Z^a$ group is CH or N or $CR^3$ where the $R^3$ radical is a branched or unbranched, saturated or unsaturated organic radical having 1 to 18, more preferably 1 to 10 and especially preferably 1 to 6 carbon atoms. The $Z^a$ group is preferably CH or N, more preferably N.

The $Z^b$ group is CH or N or, if $R^1$ is OH, $Z^b$ is C. The $Z^b$ group is preferably CH or N, more preferably N.

It is more preferable that both $Z^a$ and $Z^b$ are N, and so component A comprises a 1,3,5-triazine as base structure.

The $R^2$ radical is H or, if $R^1$ is OH, $R^2$ is —CH=N—. Preferably, $R^2$ is H.

The A radical of the general formula (II) is the corresponding radical of an appropriate primary amine of the general formula (IIa)

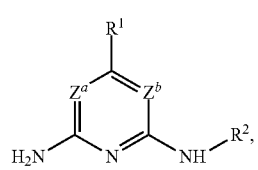

(IIa)

where $R^1$, $Z^a$, $Z^b$ and $R^2$ are as defined for the general formula (II). By reaction of a free isocyanate group of a polyisocyanate R(NCO)$_x$ with a primary amino group of the primary amine of the general formula (IIa), the A radicals of the general formula (II) can be introduced into the species of the general formula (I) to form a urea group.

Primary amines of the general formula (IIa) are characterized in that they have two amino groups in the formula representation, where at least one of these amino groups is a primary amino group. The second amino group may be a primary or secondary amino group. In the case of one primary amino group, it is preferable that the two primary amino groups differ in terms of their reactivity toward free isocyanate groups. In the case of a secondary amino group, the reactivity is automatically different since primary amino groups react at a significantly faster rate than secondary amino groups. The effect of the preferred different reactivity of the two amino groups is that only one of the amino groups reacts with a free isocyanate group of a polyisocyanate. It is preferable that the primary amine of the general formula (IIa) has two primary amino groups having different reactivities toward free isocyanate groups.

Examples of components of the general formula (IIa) are 2,4-diamino-1,3,5-triazines, 2,6-diaminopyridines, 2,4,6-triamino-1,3,5-triazine (melamine) and 2-amino-1,9-dihydro-purin-6-one (guanine).

Preferred components of the general formula (IIa) used are 2,4-diamino-1,3,5-triazines, preference being given particularly to 2,4-diamino-6-phenyl-1,3,5-triazine (benzoguanamine (BGA)) and 2,4-diamino-6-methyl-1,3,5-triazine (acetoguanamine (AGA)).

The (HX)$_y$—$Z^1$—(XH)$_{p+1}$ Component

The at least one species of the general formula (I) present in the inventive reaction product containing urethane and urea groups may contain one or more $Z^1$ radicals.

The (HX)$_y$—$Z^1$—(XH)$_{p+1}$ component of the general formula (III) is preferably used for reacting any free isocyanate groups still present, such that the species of general formula (I) no longer contains any free isocyanate groups. However, the (HX)$_y$—$Z^1$—(XH)$_{p+1}$ component of the general formula (III) can also be introduced into the species of general formula (I) in a controlled manner. This can serve, for example, to introduce an additional group with pigment affinity into the species of the general formula (I). In addition, the (HX)$_y$—$Z^1$—(XH)$_{p+1}$ component of the general formula (III) can assume the role of a branching unit or a chain terminator, depending on the number of reactive XH groups bonded to $Z^1$. It is thus possible to use this component to control the structure of the species of the general formula (I) and to adjust the density of bonding groups desired according to the application, for example properties that affect flocculation and/or adhesion.

The $Z^1$ radical(s) of the general formula (I) is/are independently the organic radical(s) of a corresponding species of the general formula (III)

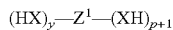

(III), where $y+(p+1)=w$, and w is an integer from 1 to 10, p is an integer from 0 to 9, y is an integer from 0 to 9.

The X group(s) is/are independently O, NH and/or $NZ^2$ and the XH group(s) is/are independently a hydroxyl group OH, a primary amino group $NH_2$ and/or a secondary amino group $NHZ^2$.

The $Z^2$ radical(s) is/are independently a branched or unbranched, saturated or unsaturated organic radical $G(XH)_j(XP)_i$ where $i+j=k$,
k is an integer from 0 to 9,
j is an integer from 0 to 9,
i is an integer from 0 to 9, and
G is a branched or unbranched, saturated or unsaturated organic radical containing preferably 1 to 100 carbon atoms, more preferably 1 to 60 carbon atoms, especially preferably 1 to 30 and most preferably 1 to 18 carbon atoms, and P is as defined for the general formula (IVa).

The organic G radical does not have any HX groups reactive toward isocyanate groups. However, the organic G radical may optionally also contain heteroatoms, especially oxygen and/or nitrogen atoms. These are preferably in the form of ether oxygen atoms and/or tertiary amino groups.

$Z^1$ is a branched or unbranched, saturated or unsaturated organic radical which contains 1 to 150 carbon atoms and is free of XH groups. Preferably, the organic $Z^1$ radical contains from 1 to 80 carbon atoms, more preferably from 1 to 40 carbon atoms and especially preferably 1 to 20 carbon atoms.

The organic $Z^1$ radical does not have any HX groups reactive toward isocyanate groups. However, the organic G radical may optionally also contain heteroatoms, especially oxygen and/or nitrogen atoms. These are preferably in the form of ether oxygen atoms and/or tertiary amino groups and/or amide groups. Preferably, the organic $Z^1$ radical contains at least one tertiary amino group. Most preferably, the organic $Z^1$ radical contains at least one tertiary amino group and at least one amide group.

Preferred $(HX)_y-Z^1-(XH)_{p+1}$ components in which $Z^1$ has at least one tertiary amino group are listed hereinafter by way of example:

Examples of commercially available $(HX)_y-Z^1-(XH)_{p+1}$ components are amino alcohols having tertiary amino groups and a sum total of 2 to 10 OH, $NH_2$ and/or $NHZ^2$ groups, for example trialkanolamines such as triethanolamine, triisopropanolamine, N-alkyldialkanolamines such as N-methyldiethanolamine, N-butyldiethanolamine, N-methyldiisopropanolamine, bis(2-hydroxyethyl)dodecylamine, bis(2-hydroxyethyl)octadecylamine, N-alkyl(aminoalkyl)hydroxyalkylamines such as aminopropylmethylethanolamine, N,N-dialkyl(dihydroxyalkyl)amines such as 3-(diethylamino)propane-1,2-diol, tetrakis(hydroxyalkyl)alkylenediamines such as tetrakis(2-hydroxypropyl)ethylenediamine, dialkylaminoalkyldialkanolamines such as dimethylaminopropyldipropanolamines, N-(3-dimethylaminopropyl)-N,N-diisopropanolamine, N-aryldialkanolamines such as N,N-di(2-hydroxyethyl)aniline, N,N-dihydroxyethyl-p-toluidine, N,N-bis(2-hydroxypropyl)-p-toluidine, N-alkanolpiperazines such as N-(2'-hydroxyethyl)piperazine and hexaalkylol-2,4,6-triamino-1,3,5-triazoles such as hexamethylol-2,4,6-triamino-1,3,5-triazine and 1,3,5-tris(2-hydroxyethyl)-1,3,5-triazine-2,4,6-trione.

Likewise suitable are polyamines having at least one tertiary amino group and 2 to 10 primary and/or secondary amino groups, for example trisaminoalkylamines such as tris(2-aminoethyl)amine, tris(2-aminopropyl)amine, tris(3-aminopropyl)amine, N-alkyldiaminoalkylamines such as N,N-bis(3-aminopropyl)methylamine, N,N-dimethyldialkylenetriamines such as N,N-dimethyldipropylenetriamine, heterocyclic amines such as 1,4-bis(3-aminopropyl)piperazine and polyethyleneimines having 2 to 10 primary and/or secondary amino groups.

A further group of $(HX)_y-Z^1-(XH)_{p+1}$ compounds can be obtained by modification of amino alcohols, amines and polyamines containing primary or secondary amino groups with a modifying component MZ bearing epoxy and/or acrylic ester groups.

By epoxy addition or Michael addition of acrylic esters, it is possible to convert primary amines to secondary amines and secondary amines to tertiary amines. The reaction of an epoxy group with a primary or secondary amino group always also gives rise to an OH group. By addition of hydroxy-functional acrylic esters, it is likewise possible to obtain additional OH groups. By addition of di- or polyfunctional epoxides or acrylates, it is possible to obtain compounds having multiple functional groups.

For example, by addition of hydroxy-functional acrylates, for example hydroxyethyl acrylate, or epoxides, for example 2-ethylhexyl glycidyl ether, onto amino alcohols having secondary amino groups, for example N-(2-hydroxyethyl)aniline, it is possible to obtain compounds having one tertiary amino group and two hydroxyl groups, as shown by way of example in scheme 1 below:

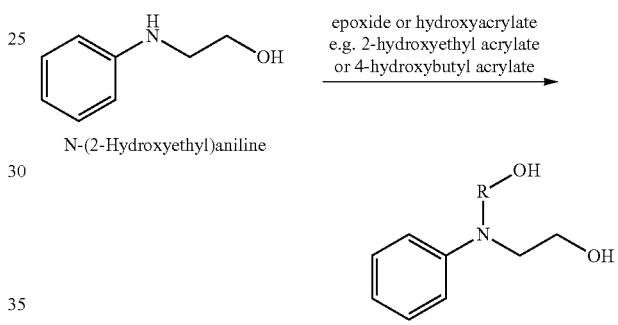

In the case of amino alcohols or other amines having primary amino groups, these can be converted to tertiary amines by reaction with 2 mol of the modifying component MZ, as shown by way of example in scheme 2 below:

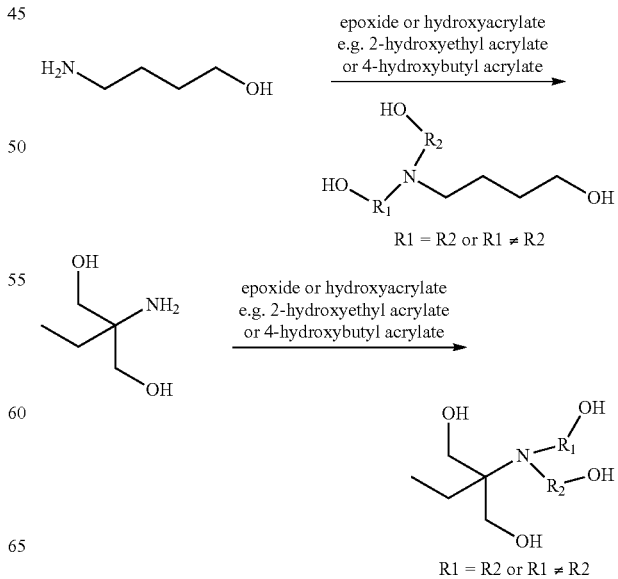

A formula example for the addition of polyfunctional epoxides is shown in scheme 3:

Scheme 3

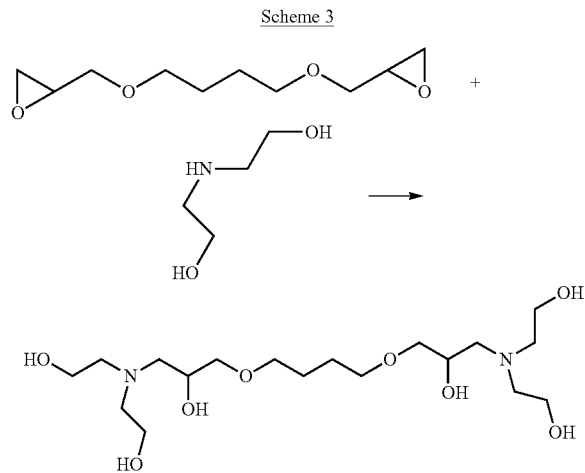

The aforementioned reactions with epoxides or hydroxy acrylates are appropriately effected within a temperature range from 20 to 140° C., preferably at not more than 120° C. and more preferably at not more than 100° C.

The reaction with the epoxides gives rise to a secondary hydroxyl group and to a secondary or tertiary amino group on the nitrogen atom involved in the reaction.

Examples of amines suitable for reaction with the component MZ are, for example, aliphatic and araliphatic amines having at least one primary or secondary amino group, such as butylamine, ethylhexylamine, benzylamine, oleylamine, dibutylamine, xylylenediamine, 1,4-bis(4-aminophenoxy)benzene; aliphatic and araliphatic amino alcohols having at least one primary or secondary amino group, such as ethanolamine, butanolamine, diethanolamine, 2-amino-2-methyl-1-propanol, 2-amino-1-butanol, 2-amino-2-methylpropane-1,3-diol, 2-amino-2-ethylpropane-1,3-diol, 1-aminopropane-2,3-diol, 2-aminopropane-1,3-diol, tris(hydroxymethyl)aminomethane; and aliphatic and araliphatic diamines having one tertiary amino group and one primary or secondary amino group, such as 2-(diethylamino)ethylamine, 3-(dimethylamino)propylamine, 3-(diethylamino)propylamine, N,N-diethylbutane-1,4-diamine, 1-diethylamino-4-aminopentane, N-(3-aminopropyl)imidazole, N-(3-aminopropyl)morpholine, N-(2-aminoethyl)piperidine, 2-picolylamine, 1-methylpiperazine, aminoethylpiperazine.

Examples of polyfunctional acrylates suitable as component MZ are: di-, tri-, tetrafunctional polyester acrylates, polyether acrylates, polyether/ester acrylates, urethane or epoxy acrylates, mono-, di-, tri- or polyalkylene glycol diacrylates, for example mono-, di-, tri- or polyethylene glycol diacrylate, mono-, di-, tri- or polypropylene glycol diacrylate, butanediol diacrylate, hexane-1,6-diol diacrylate, trimethylolpropane triacrylate, neopentyl glycol propyleneoxy diacrylate, tricyclodecanediol diacrylate, glycerol diacrylate, glycerol triacrylate, trimethylolpropane triacrylate, di(trimethylolpropane) tetraacrylate, pentaerythritol triacrylate, dipentaerythritol pentaacrylate.

Examples of polyfunctional epoxides are: mono-, di-, tri- or polyalkylene glycol glycol diglycidyl ethers, for example: mono-, di-, tri- or polyethylene glycol diglycidyl ether, propanediol diglycidyl ether, di-, tri- or polypropylene glycol diglycidyl ether, butane-1,4-diol diglycidyl ether, hexane-1,6-diol diglycidyl ether, cyclohexanedimethanol diglycidyl ether, neopentyl glycol diglycidyl ether, glycerol triglycidyl ether, di-, tri- or polyglycerol triglycidyl ether, trimethylolpropane triglycidyl ether, pentaerythritol tetraglycidyl ether, dipentaerythritol pentaglycidyl ether. Bisphenol A-based diglycidyl ethers, epoxyphenol novolak, and epoxycresol novolak.

Examples of monofunctional acrylates are alkyl acrylates, for example methyl acrylate, ethyl acrylate, n-propyl acrylate, i-propyl acrylate, n-butyl acrylate, i-butyl acrylate, t-butyl acrylate, 2-ethylhexyl acrylate, cyclohexyl acrylate and lauryl acrylate; monoacrylates of short-chain ethers, such as tetrahydrofurfuryl acrylate, methoxyethoxyethyl acrylate, 1-butoxypropyl acrylate, cyclohexyloxymethyl acrylate, methoxymethoxyethyl acrylate, benzyloxymethyl acrylate, furfuryl acrylate, 2-butoxyethyl acrylate, 2-ethoxyethyl acrylate, allyloxymethyl acrylate, 1-ethoxybutyl acrylate, 1-ethoxyethyl acrylate and ethoxymethyl acrylate.

Suitable hydroxy-functional acrylates are, for example, 2-hydroxyethyl acrylate, 2-hydroxypropyl acrylate, 2-hydroxybutyl acrylate, 2-(2-hydroxyethoxy)ethyl acrylate, 2-hydroxy-3-[3-(trimethoxysilyl)propoxy]propyl acrylate, 2-hydroxy-3-phenoxypropyl acrylate, polyethylene glycol acrylates, for example the AE-90, AE-200 and AE-400 products sold by NOF under the BLEMMER® trade name, polypropylene glycol acrylates for example the AP-150, AP-400 and AP-550 products sold by NOF under the BLEMMER® trade name and lactone-modified hydroxyethyl acrylates, for example the FA products sold by the DAICEL Corporation under the Placcel trade name.

Suitable monofunctional epoxides are, for example, aliphatic, cycloaliphatic and/or aromatic glycidyl ethers, for example $C_1$-$C_{20}$-alkyl glycidyl ethers, phenyl glycidyl ether, cresyl glycidyl ether, naphthyl glycidyl ether, butyl glycidyl ether, p-tert-butylphenyl glycidyl ether, 2-ethylhexyl glycidyl ether, $C_{12}$-$C_{14}$ glycidyl ethers, allyl glycidyl ether, 2,3-epoxypropyl neodecanoate (Cardura® E 10, Resolution Performance Products).

Preferred $(HX)_y$—$Z^1$—$(XH)_{p+1}$ species of the general formula (III) in which $Z^1$ has at least one tertiary amino group and one amide group are listed hereinafter by way of example: Corresponding species in which $Z^1$ has both a tertiary amino group and an amide group are generally not commercially available. They are preferably obtained by reacting one or more components D with one or more components B and/or C.

Component D is independently selected from the group of ethylenically unsaturated carboxylic acids, esters thereof and acid halides thereof, where at least one C═C double bond and at least one C═O double bond are in conjugated form and the C═O double bond is selected from the group of the carboxylic acids, the carboxylic esters and the carbonyl halides.

Preference is given to using ethylenically unsaturated carboxylic esters as component D.

Examples of ethylenically unsaturated ester compounds in which the C═C double bond and the C═O double bond of the ester group are conjugated are alkyl acrylates, for example methyl acrylate, ethyl acrylate, n-propyl acrylate, i-propyl acrylate, n-butyl acrylate, i-butyl acrylate, t-butyl acrylate, 2-ethylhexyl acrylate, cyclohexyl acrylate and lauryl acrylate; monoacrylates of short-chain ethers, such as tetrahydrofurfuryl acrylate, methoxyethoxyethyl acrylate, 1-butoxypropyl acrylate, cyclohexyloxymethyl acrylate, methoxymethoxyethyl acrylate, benzyloxymethyl acrylate, furfuryl acrylate, 2-butoxyethyl acrylate, 2-ethoxyethyl acrylate, allyloxymethyl acrylate, 1-ethoxybutyl acrylate, 1-ethoxyethyl acrylate, ethoxymethyl acrylate; maleic diesters, such as dimethyl maleate, diethyl maleate and dibutyl maleate; fumaric diesters, such as dimethyl fumarate, diethyl fumarate and dibutyl fumarate; itaconic esters, such as dimethyl itaconate and diethyl itaconate.

Preferably, component D is selected from the acrylic esters, more preferably from the short-chain alkyl acrylates having a $C_1$- to $C_6$-alkyl chain. Most preferred are methyl acrylate and ethyl acrylate.

Component B is of the general formula (VI)

$$(R^3)_x\text{—HN—}(R^4)_z \quad (VI),$$

where x+z=2 and
x is an integer from 0 to 2,
z is an integer from 0 to 2, and
$R^3$ is independently H or a branched or unbranched, saturated or unsaturated organic radical having 1 to 12 carbon atoms, and
$R^4$ is independently a branched or unbranched, saturated or unsaturated organic radical having 2 to 12 carbon atoms and 1 to 3 tertiary amino groups, which may optionally also have 1 to 3 primary and/or secondary amino groups.

If two or more components B are present, these are independently represented by the above formula.

Examples of component B in which x assumes the value of 2 are butylamine, hexylamine, dibutylamine, diethylamine, dipropylamine, benzylamine, N-benzylmethylamine and N-phenylbenzylamine.

Examples of component B in which x assumes the value of 1 are N,N-dimethylaminoethylamine, N,N-dimethylaminopropylamine, N,N-diethylaminoethylamine, N,N-diethylaminopropylamine, tris[2-(methylamino)ethyl]amine, N,N-dimethyldipropylenetriamine, N,N-bis(3-aminopropyl)methylamine, tris(3-aminopropyl)amine, tris(2-aminoethyl)amine, 2-(2-methylaminoethyl)pyridine, 2-aminomethylpyridine, 4-aminomethylpyridine, 1-(3-aminopropyl)imidazole and N,N,N'-trimethylenediamine.

One example of component B in which x assumes the value of 0 is bis(3-dimethylaminopropyl)amine.

Component C is of the general formula (VII)

$$(R^5)_k\text{—HN—}(R^6)_n \quad (VII),$$

where k+n=2 and
k is an integer from 0 to 1,
n is an integer from 1 to 2, and
$R^5$ is H or a branched or unbranched, saturated or unsaturated organic radical having 1 to 12 carbon atoms, and
$R^6$ is independently a branched or unbranched, saturated or unsaturated organic radical having 2 to 12 carbon atoms and 1 to 4 hydroxyl groups, which may optionally contain a tertiary amino group.

If two or more components C are present, these are independently represented by the above formula.

Examples of component C in which k assumes the value of 0 are diethanolamine, diisopropanolamine, dipropanolamine, N-(2'-hydroxyethyl)piperazine, 3-((2-hydroxyethyl)amino)-1-propanol.

Examples of component C in which k assumes the value of 1 are ethanolamine, propanolamine, 4-amino-1-butanol, 3-amino-1-butanol, 1-aminopropan-2-ol, 5-amino-1-pentanol, N-(2-hydroxyethyl)-N-methylpropylene-1,3-diamine, 2-amino-2-ethylpropane-1,3-diol, N-methylethanolamine, N-ethylethanolamine, N-butylethanolamine, N-(2-hydroxyethyl)aniline, 1,1,1-tris(hydroxymethyl)methanamine, aminopropyldiethanolamine, glucosamine and 2-(2-aminoethoxy)ethanol.

Preferably, the species of the general formula (III) in which the $Z^1$ radical has at least one tertiary amino group and one amide group is prepared in two steps.

The first step here is the addition of a primary or secondary amino group of a component B and/or C onto the C=C double bond of a component D in a Michael addition reaction. The corresponding product is a Michael addition product and is referred to hereinafter as intermediate I. These reactions are preferably effected within a temperature range from 0 to 100° C., more preferably from 10 to 80° C. and especially preferably from 15 to 50° C.

Primary amino groups are capable of reacting twice in a Michael addition. For this purpose, the primary amino group of a component B or C first adds on to the C=C double bond of a component D to form a secondary amino group. This secondary amino group is capable of reacting in a further Michael addition with a C=C double bond of a component D to form a tertiary amino group. The double Michael addition product of a component B or C with two independently selected components D is also an intermediate I as described above.

In the second reaction step, at least one of the C=O double bonds present in the intermediate I, selected from the group of the carboxylic acids, the carboxylic esters and the carbonyl halides, is reacted with a primary or secondary amino group of a component B or C in an amidation reaction to form a species of general formula (III). It is preferable that the C=O double bond present in the intermediate is in the form of a carboxylic ester group.

These reactions are preferably effected within a temperature range from 50 to 180° C., more preferably from 70 to 160° C. and especially preferably from 80 to 150° C.

When the intermediate I has more than one C=O double bond selected from the group of the carboxylic acids, the carboxylic esters and the carbonyl halides, these can also be reacted in an amidation reaction with a primary or secondary amino group to give an amide group.

The cleavage products formed in the amidation reaction, for example alcohol formed in the case of the preferred carboxylic ester hydrolysis, are removed from the reaction mixture during or after the reaction. In addition, any solvent used in the reaction is removed from the reaction mixture.

For example, it is also possible that preparation of a species of the general formula (III) in which $Z^1$ has at least one tertiary amino group and one amide group is accomplished using reactants that are already an intermediate I, such that these can be reacted in one or more amidation reactions with one or more primary or secondary amino groups of components B and/or C to give products of the general formula (III).

It is also possible, for example, that preparation of a species of the general formula (III) in which $Z^1$ has at least one tertiary amino group and one amide group is accomplished using reactants having at least one amide group and at least one C=C double bond in conjugation with the C=O double bond of the amide group. Species of the general formula (III) are then prepared by Michael addition of a primary or secondary amino group of component B or C onto the C=C double bond.

The selection of components B of formula (VI) and/or C of the general formula (VII) for preparation of a species of general formula (III) in which $Z^1$ has at least one tertiary amino group and at least one amide group is not subject to any further restriction and is merely subject to the provision that the resulting product is a species of general formula (III). This means that the product contains 1 to 10 groups reactive toward isocyanate groups, and also at least one tertiary amino group and at least one amide group.

The invention also relates to a process for preparing the inventive reaction products containing urethane and urea groups or the species of the general formula (I) that are present therein.

In the process of the invention for preparing the inventive reaction products containing urethane and urea groups, i) b alcohols $Y-(OH)_q$ are reacted with at least one polyisocyanate $R(NCO)_x$ to form at least one urethane of the general formula (V)

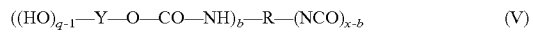

$$((HO)_{q-1}-Y-O-CO-NH)_b-R-(NCO)_{x-b} \quad (V)$$

where the urethane of the general formula (V) contains at least one free isocyanate group, and q, b, x, Y and R are as defined for the general formula (I), and ii) at least one urethane of the general formula (V) is reacted with a species of the general formula (IIa)

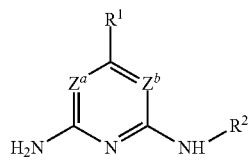

where $R^1$, $Z^a$, $Z^b$ and $R^2$ are as defined for the general formula (II), and iii) optionally with c components of the general formula (III)

$$(HX)_y-Z^1-(XH)_{p+1} \quad (III),$$

where X, $Z^1$, p and y are as defined for the general formula (I)

to give a reaction product containing urethane and urea groups, comprising at least one species of the general formula (I)

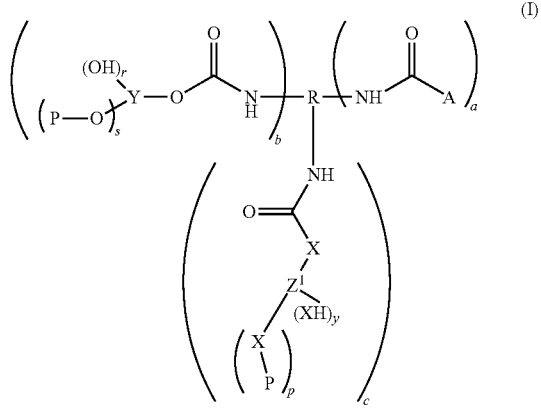

where the variables of the general formula (I) are as defined above.

In the preparation of the urethane of the general formula (V) in step i), the polyisocyanate $R(NCO)_x$ is used preferably at least in an equimolar ratio to the alcohol $Y-(OH)_q$, where the free NCO groups of the polyisocyanate $R(NCO)_x$ are preferably present at least in an equimolar ratio relative to the hydroxyl groups of the alcohol $Y-(OH)_q$. Preferably, the polyisocyanate $R(NCO)_x$ is used in step i) in a molar excess, as a result of which a higher selectivity is achieved in that preferably at least one NCO group of the polyisocyanate is not converted in step i).

The greater the molar excess of the polyisocyanate, the higher the selectivity normally is with respect to the preparation of the urethane covered by the general formula (V) which is produced in step i). The unconverted polyisocyanate that remains owing to use in excess is preferably at least partly (but very substantially completely) removed from the reaction mixture, preferably by distillation, in order ultimately to keep the proportion of by-products formed therefrom at a low level. Preferably at least 75 mol %, more preferably at least 90 mol % and most preferably the entire fraction of the unconverted portion of the polyisocyanate $R(NCO)_x$ is removed from the reaction mixture. The polyisocyanate worsens the quality of the process product and is considered to be environmentally harmful.

It is particularly preferable that the polyisocyanates $R(NCO)_x$ used in the process of the invention are diisocyanates $R(NCO)_2$ and the alcohols $Y-(OH)_q$ used are monoalcohols Y—OH. In this case, selectivity with regard to the preparation of the urethane covered by the general formula (V) which is produced in step i) is increased by using a diisocyanate $R(NCO)_2$ having two isocyanate groups of different reactivity. More preferably, the diisocyanate $R(NCO)_2$ having two isocyanate groups of different reactivity is selected from the group consisting of toluene 2,4-diisocyanate and isophorone diisocyanate. Preferably, in step i), the diisocyanate $R(NCO)_2$ is used relative to the monoalcohol Y—OH in a molar ratio of at least 1.1:1.0, more preferably of at least 2.0:1.0 and most preferably of at least 2.5:1.0. It is most preferred that, in step i), both one or more diisocyanates having isocyanate groups of different reactivity are used and a molar excess of isocyanate component in relation to the monoalcohol Y—OH is used.

In the process of the invention, the isocyanate addition, according to the reactivity of the individual coreactants, can be effected within the temperature range which is customary for this kind of reaction from room temperature to about 150° C., preferably to 100° C., more preferably to 70° C. For acceleration and to reduce the level of side reactions, it is possible to use the known and customary catalysts, such as tertiary amines, triethylamine, dimethylcyclohexylamine, N-methylmorpholine, N,N'-dimethylpiperazine, 2-(dimethylaminoethoxy)ethanol, diazabicyclo[2.2.2]octane and the like, and also especially organic metal compounds, such as titanic esters, iron compounds such as iron(III) acetylacetonate, tin compounds, for example tin diacetate, tin dioctoate, tin dilaurate or the dialkyl derivatives of tin dialkyl salts of aliphatic carboxylic acids such as dibutyltin diacetate, dibutyltin dilaurate or the like. These catalysts are typically used in amounts of 0.0001 to 0.1 part by weight per 100 parts by weight of diisocyanate.

It should be emphasized that the inventive reaction products containing urethane and urea groups that are preparable by the process of the invention or the species of the general formula (I) that are present therein exhibit good dispersing action with regard to a broad spectrum of solids to be dispersed. One way in which this is manifested is that solids having acidic, neutral and basic surfaces can each be effectively dispersed.

The reaction products containing urethane and urea groups that are preparable by the process of the invention or the species of the general formula (I) that are present therein are of particularly high quality and universally usable as wetting agents and dispersants. In specific terms, it can be stated that the reaction products containing urethane and urea groups that are preparable in accordance with the invention or the species of the general formula (I) that are present therein can be used successfully both in polar and in nonpolar binder systems, and at the same time exhibit excellent compatibility as wetting agents and dispersants or as dispersion stabilizers or as adhesion promoters. This ensures successful use in combination with a wide variety of different binders and coating materials. In addition, the reaction products containing urethane and urea groups that are preparable by the process of the invention or the species of the general formula (I) that are present therein enable flocculation-free miscibility of pastes, especially pigment pastes, or of the binders produced with these pastes. Furthermore, the inventive reaction products containing urethane and urea groups or the species of the general formula (I) that are present therein are suitable as dispersion stabilizers, especially also as emulsion stabilizers. The use of the reaction products containing urethane and urea groups that are preparable by the process of the invention or the species of the general formula (I) that are present therein distinctly reduces the viscosity of the millbase introduced during the dispersion and, in this way, enables the production of formulations having a high solids content. In this way, for better environmental compatibility, the proportion of (volatile) solvents can be reduced. In summary, it can be stated that the reaction products containing urethane and urea groups that are preparable by the process of the invention or the species of the general formula (I) that are present therein, with good stabilization of pigments or fillers, lower the millbase viscosity of corresponding varnishes, pastes or plastics formulations to such an extent that processing is possible at a high fill level without any adverse effect on the stability of the cured varnishes. Through a suitable choice of the organic Y radical, it is also possible to produce separating agents which can be used, for example, in the field of plastics production or in composite materials or fiber composite materials. Finally, it should be mentioned that the process of the invention is performable in a comparatively simple and economically viable manner, and the starting materials used are generally readily available.

The non-aftertreated or -purified reaction products containing urethane and urea groups that are prepared by the process of the invention typically contain small amounts of products that are not species of the general formula (I) owing to side reactions that occur. Possible side reactions using a diisocyanate $R(NCO)_x$ and a monoalcohol Y—OH are, for example, the double reaction of a diisocyanate $R(NCO)_2$ with a monoalcohol Y—OH to form a diurethane of the general formula Y—O—CO—NH—R—NH—CO—O—Y and the double reaction of a diisocyanate $R(NCO)_2$ with a species of the general formula (IIa) to form a diurea of the general formula A-CO—NH—R—NH—CO-A. In addition, there is the possibility of a double reaction of the amino groups of the general formula (IIa) with one free isocyanate group each of two polyisocyanates $R(NCO)_x$. The aforementioned side reactions merely show examples of some side reactions that can occur. However, other side reactions that do not lead to inventive species of general formula (I) are possible. Correspondingly small amounts of these by-products do not cause any detriment at all with regard to use as wetting agents and dispersants, and are a clear pointer that the reaction products containing urethane and urea groups have been prepared using the process of the invention. In addition, the inventive reaction products containing urethane and urea groups may also contain a small amount of the unconverted urethane of the formula (V). The use of appropriate amounts of a species of the general formula (IIa) in step ii) or optionally of a component of the general formula (III) in step iii) of the process of the invention allows the proportion of the urethane of the general formula (V) generally to be reduced almost to zero, which is usually advantageous in respect of the quality, especially for preparation of products of maximum homogeneity, and the avoidance of sediment and turbidity in the inventive reaction products containing urethane and urea groups. Corresponding reactions in step ii) or after optional step iii) of the process of the invention are preferably considered to have ended when an NCO content of <0.1% is found. The inventive reaction products containing urethane and urea groups are environmentally friendly, have good storability and—in a corresponding manner to the inventive species of the general formula (I) as such—exhibit excellent properties as wetting agents and dispersants and as adhesion promoters.

Solvent

According to viscosity, the process of the invention can be conducted in neat form or in the presence of suitable solvents, solvent mixtures or other suitable carrier media. Suitable solvents or carrier media are all those that are unreactive or whose reactivity toward the coreactants under the reaction conditions chosen is negligible and in which the reactants and the reaction products are at least partly soluble. Examples of these include hydrocarbons such as toluene, xylene, aliphatic and/or cycloaliphatic petroleum fractions, chlorinated hydrocarbons such as chloroform, trichloroethane, cyclic and acyclic ethers such as dioxane, tetrahydrofuran, polyalkylene glycol dialkyl ethers such as dipropylene glycol dimethyl ether, esters of mono-, di- or polycarboxylic acids such as ethyl acetate, butyl acetate, butyrolactone, dimethyl 2-methylglutarate, triacetin, phthalates or other plasticizers, di- or polycarboxylic esters, dialkyl esters of $C_2$-$C_4$ dicarboxylic acids that are referred to as "dibasic esters", alkyl glycol esters such as ethyl glycol acetate, methoxypropyl acetate, ketones such as methyl isobutyl ketone, cyclohexanone, acetone, acid amides such as dimethylformamide, N-methylpyrrolidone and the like.

For the performance of the above-described reactions, the solvents should appropriately be selected such that they are inert with respect to the reactants under the reaction conditions.

Appropriately, the solvent(s) or carrier media are selected already taking account of the planned field of use. For example, for use in water-thinnable varnish systems or for coating of pigments in aqueous suspension after the pigment synthesis, preference is given to using solvents that are fully or partly water-thinnable. If the process product is to be used, for example, at a location where the presence of volatile organic compounds (VOCs) is undesirable, the formulation should be in very substantially solvent-free form or in carrier materials that are correspondingly regarded as being VOC-free.

According to the field of use, the solvents used for the synthesis may remain in the reaction mixture or are wholly or partly removed and optionally replaced by other solvents or carrier media.

The solvent may be wholly or partly removed, for example, by distillation, optionally under reduced pressure and/or by azeotropic means with addition of water. The active substance (compound of the general formula (I)) may alternatively be isolated by precipitation by means of addition of nonsolvents such as aliphatic hydrocarbons, for example hexane, followed by separation by means of filtration and optionally drying. The active substance obtained by one of these methods can then be partly dissolved in a solvent suitable for the particular field of use or, if appropriate, be used in pure form, for example in powder coatings, or applied to inert supports. For applications in which the use of solids is preferred, such as powder coatings or particular plastics processing methods, the compounds can also be converted to a solid form by further known methods. Examples of such processes are microencapsulation, spray-drying, adsorption on a solid support such as $SiO_2$, or the PGSS (particles from gas saturated solutions) method.

Modifications

In a further embodiment, the XH groups still present in the inventive reaction product containing urethane and urea groups, i.e. OH groups and/or primary and/or secondary amino groups, can be converted further in a subsequent reaction, for example reacted with carboxylic anhydrides. In that case, the inventive reaction products containing urethane and urea groups serve as intermediates in the preparation of modified, likewise inventive reaction products containing urethane and urea groups. The modified products can be used in the same fields as the as yet unmodified inventive reaction products containing urethane and urea groups. The modification can, for example, increase or adjust the compatibility of the reaction products with respect to particular media.

Any tertiary amino groups present, which may especially be present in the $Z^1$ and/or $Z^2$ radicals, can be converted with oxygen, peroxo compounds such as percarboxylic acids and hydrogen peroxide to amine oxides which can additionally be converted to salts with acids, for example hydrochloric acid.

Salt Conversion Products

The inventive reaction products containing urethane and urea groups or the species of general formula (I) that are present therein may contain tertiary amino groups, especially via the $Z^1$ and/or $Z^2$ radicals. All or some of these may be converted to salts. The tertiary amino groups may, for example, be converted to corresponding ammonium salts with acids such as carboxylic acids, carboxylic acid derivatives, for example carbonyl halides, or phosphoric acids and esters thereof. In that case, the inventive reaction products containing urethane and urea groups serve as intermediates in the preparation of likewise inventive reaction products containing urethane and urea groups that have been converted to salts. The products that have been converted to salts can be used in the same fields as the inventive reaction products containing urethane and urea groups that have not been converted to salts. Conversion to salts can, for example, increase or adjust the compatibility of the reaction products with respect to particular media or affect the interaction with solid particles such as pigments and/or fillers.

Quaternization Products

The inventive reaction products containing urethane and urea groups or the species of general formula (I) that are present therein contain preferably tertiary amino groups, especially in the $Z^1$ and/or $Z^2$ radicals. All or some of these may be converted to corresponding quaternary ammonium salts by reaction with quaternizing reagents. In that case, the inventive reaction products containing urethane and urea groups serve as intermediates in the preparation of quaternized, likewise inventive reaction products containing urethane and urea groups. The quaternized products can be used in the same fields as the inventive reaction products containing urethane and urea groups that have not been quaternized. Quaternization can, for example, increase or adjust the compatibility of the reaction products with respect to particular media or affect the interaction with solid particles such as pigments and/or fillers.

Suitable quaternizing reagents may be chosen, for example, from the group of the alkyl halides and aralkyl halides or aralkyl compounds having leaving groups, such as triflate, methylsulfate or tosylate, which can enter into nucleophilic substitution reactions with tertiary amines, or oxiranes such as alkylene oxides or glycidyl ethers, in the presence of acids or derivatives thereof, such as carboxylic acids, sulfonic acids or phosphoric acids and the esters or halides thereof.

Examples of suitable quaternizing reagents are benzyl chloride, 2- or 4-vinylbenzyl chloride, methyl chloride, methyl iodide, methyl tosylate or dimethyl sulfate. Preference is given to benzyl chloride and 4-vinylbenzyl chloride.

A further means of quaternization is the use of glycidyl ethers in the presence of acids. Examples of suitable glycidyl ethers are glycidyl methacrylate, alkyl glycidyl ethers such as 2-ethylhexyl glycidyl ether and C13/C15 glycidyl ethers (trade name, for example, Grilonit RV 1814) or aryl glycidyl ethers such as cresyl glycidyl ether. Acids suitable for this quaternization reaction are, for example, carboxylic acids such as benzoic acid, acetic acid or lactic acid. Further acids are acidic phosphoric esters having one or two ester groups.

Inventive Use

The present invention further relates to the use of the above-described inventive reaction products containing urethane and urea groups or of the species of the general formula (I) present therein as an additive, preferably as a wetting agent and/or dispersant and/or dispersion stabilizer and/or adhesion promoter in compositions such as solid blends or coatings, especially varnishes, plastics, pigment pastes, sealants, cosmetics, ceramics, adhesives, potting compounds, spackling compounds, printing inks and other inks.

The invention also relates to the compositions detailed above, such as solid blends or coatings, especially varnishes, plastics, pigment pastes, sealants, cosmetics, ceramics, adhesives, potting compounds, spackling compounds, printing inks and other inks. The solid blends preferably contain particles and/or fibers that have been treated with the above-described inventive reaction products containing urethane and urea groups or the species of the general formula (I) that are present therein.

Finally, the invention relates to varnishes and plastics comprising the inventive reaction products containing urethane and urea groups or the species of the general formula (I) that are present therein.

The inventive reaction products containing urethane and urea groups or the species of the general formula (I) that are present therein find use, for example, as aluminum passivators, dispersants, dispersion stabilizers, wetting agents or adhesion promoters and can be used, for example, in pigmented and/or filler-containing products, for example pigment concentrates or pastes, coating compositions, sealants, plastics, ceramics, cosmetics, adhesives, potting compounds, spackling compounds, printing inks and/or other inks. Preference is given to pigment concentrates which can be mixed with appropriate letdown systems, by means of which pigmented varnishes are produced.

For example, the inventive reaction products containing urethane and urea groups or the species of the general formula (I) that are present therein may be used, for example, in the production or processing of varnishes, printing inks, other inks, for example for inkjet printing, paper coating, leather and textile dyes, pastes, pigment concentrates, ceramics, adhesives and sealants, potting compounds, plastics and cosmetic formulations, especially when these contain solids such as pigments and/or fillers (including fibrous fillers).

It is also possible to use these in the production or processing of molding compounds based on synthetic, semisynthetic or natural macromolecular substances, such as polyvinyl chloride, saturated or unsaturated polyesters, polyurethanes, polystyrenes, polyacrylates, polyamides, epoxy resins, polyolefins such as polyethylene or polypropylene. For example, these can be used for production of potting compounds, casting compounds, PVC plastisols, gelcoats, polymer concrete, printed circuit boards, industrial varnishes, wood and furniture varnishes, motor vehicle paints, marine paints, anticorrosion paints, can and coil coatings or decorating paints and architectural paints.

The inventive reaction products containing urethane and urea groups or the species of the general formula (I) that are present therein can be used not just in letdown systems for pigmented varnishes. It is likewise possible to use them in a wide range of formulations or products, such as resins, oils, greases, lubricants, rubber materials, sealants, printing inks, other inks, adhesives, waxes or coating compositions. The concentrates can also be used in formulations which are produced in the personal care industry or in electrical applications in the electronics industry, in the marine industry, in the context of medical applications, in the construction industry or in the automobile industry. Examples include electronic paper, such as the display in E-books, the encapsulation of microelectronic chips and printed circuit boards, underwater skin coatings for ships, such as antifouling coatings, silicone tubes or sliding additives for brake components.

The inventive reaction products containing urethane and urea groups or the species of the general formula (I) that are present therein can advantageously also be used in the production of color filters for liquid-crystal displays, liquid-crystal screens, color resolution devices, sensors, plasma screens, SED-based displays (Surface conduction Electron emitter Display), and for MLCCs (multilayer ceramic compounds). MLCC technology is employed in the production of microchips and printed circuit boards.

Use in cosmetic preparations can serve, for example, for production of cosmetic formulations such as makeup, face powder, lipsticks, hair dyes, creams, nail varnishes and sunscreen preparations. These may be in the customary forms, for example in the form of W/O or O/W emulsions, solutions, gels, creams, lotions or sprays. The inventive reaction products containing urethane and urea groups or the species of the general formula (I) that are present therein can advantageously be used in dispersions used for production of these formulations. These may comprise the carrier media that are customary for these purposes in cosmetics, such as water, castor oils or silicone oils, and solids such as organic and inorganic pigments, such as titanium dioxide or iron oxide.

Mention should likewise be made of the fields of use of NIP (nonimpact printing), inkjet printing (on paper, film, ceramic or synthetic and natural fiber fabric), dispersing of ceramics (in aqueous or anhydrous form), dispersing in potting compounds. The inventive reaction products containing urethane and urea groups or the species of the general formula (I) that are present therein may also be used in the aforementioned formulations and fields of use as they are, i.e. without having been incorporated into an appropriate concentrate beforehand.

Typically, the product comprising the inventive reaction products containing urethane and urea groups or the species of the general formula (I) that are present therein and also pigments and/or fillers is a varnish, or a pigment concentrate for coating compositions. Ultimately, however, it is possible to use the inventive reaction products containing urethane and urea groups or the species of the general formula (I) that are present therein in any pigment-containing and/or filler-containing products.

More particularly, the pigment concentrates are compositions which, as well as the inventive reaction products containing urethane and urea groups or the species of the general formula (I) that are present therein, comprise, for example, organic solvents and at least one pigment. The latter especially contain only small proportions, if any, of organic polymers as binders. Known binders of this kind are advantageously present in the corresponding letdown systems and are described hereinafter.

Organic solvents used are especially the typical organic solvents that are known to the person skilled in the art and are used in the field of the coatings and paints industry, such as aliphatic solvents, cycloaliphatic solvents, aromatic solvents such as toluene, xylene, solvent naphtha, ethers, esters and/or ketones, for example butyl glycol, butyl diglycol, butyl acetate, methyl isobutyl ketone, methyl ethyl ketone and/or solvents such as methoxypropyl acetate, diacetone alcohol.

Pigments used are the pigments known to those skilled in the art. Frequently, combinations of various pigments are used to obtain the desired properties. Examples of pigments are monoazo, diazo, triazo and polyazo pigments, oxazine pigments, dioxazine pigments, thiazine pigments, diketopyrrolopyrroles, phthalocyanines, ultramarine and other metal complex pigments, indigoid pigments, diphenylmethane pigments, triarylmethane pigments, xanthene pigments, acridine pigments, quinacridone pigments, methine pigments, anthraquinone, pyranthrone pigments and perylene pigments and other polycyclic carbonyl pigments, inorganic pigments such as carbon black pigments and/or pigments based on carbon black, graphite, zinc, titanium dioxide, zinc oxide, zinc sulfide, zinc phosphate, barium sulfate, lithopone, iron oxide, ultramarine, manganese phosphate, cobalt aluminate, cobalt stannate, cobalt zincate, antimony oxide, antimony sulfide, chromium oxide, zinc chromate, mixed metal oxides based on nickel, bismuth, vanadium, molybdenum, cadmium, titanium, zinc, manganese, cobalt, iron, chromium, antimony, magnesium, aluminum (for example nickel titanium yellow, bismuth vanadate molybdate yellow or chromium titanium yellow), magnetic pigments based on pure iron, iron oxides and chromium oxides or mixed oxides, metal effect pigments comprising aluminum, zinc, copper or brass and also pearlescent pigments or fluorescent and phosphorescent luminous pigments. Further examples are nanoscale organic or inorganic solids having particle sizes below 100 nm in at least one dimension, such as certain types of carbon black or other allotropic forms of carbon, such as single-wall CNTs, multiwall CNTs and graphene. The particle size is determined, for example, by means of transmission electron microscopy, analytical ultracentrifugation or methods of light scattering. Mention should likewise be made of particles consisting of a metal or semimetal oxide or hydroxide, and also particles consisting of mixed metal and/or semimetal oxides or hydroxides. For example, the oxides and/or oxide hydroxides of aluminum, silicon, zinc, titanium, etc., can be used to produce such extremely finely divided solids. These oxide or hydroxide or oxide-hydroxide particles can be produced by a wide variety of different processes, for example ion exchange processes, plasma processes, sol-gel processes, precipitation, comminution (for example by grinding) or flame hydrolysis. All the aforementioned pigments may be in surface-modified form and have basic, acidic or neutral groups at the surface.

Further examples are the following pigments listed under their Color Index number (C.I.):

Examples of red pigments are C. I. Pigment Red 1, 2, 3, 4, 5, 6, 7, 8, 9, 12, 14, 15, 16, 17, 21, 22, 23, 31, 32, 37, 38, 41, 47, 48, 48:1, 48:2, 48:3, 48:4, 49, 49:1, 49:2, 50:1, 52:1, 52:2, 53, 53:1, 53:2, 53:3, 57, 57:1, 57:2, 58:4, 60, 63, 63:1, 63:2, 64, 64:1, 68, 69, 81, 81:1, 81:2, 81:3, 81:4, 83, 88, 90:1, 101, 101:1, 104, 108, 108:1, 109, 112, 113, 114, 122, 123, 144, 146, 147, 149, 151, 166, 168, 169, 170, 172, 173, 174, 175, 176, 177, 178, 179, 181, 184, 185, 187, 188, 190, 193, 194, 200, 202, 206, 207, 208, 209, 210, 214, 216, 220, 221, 224, 230, 231, 232, 233, 235, 236, 237, 238, 239, 242, 243, 245, 247, 249, 250, 251, 253, 254, 255, 256, 257, 258, 259, 260, 262, 263, 264, 265, 266, 267, 268, 269, 270, 271, 272, 273, 274, 275, and 276.

Examples of blue pigments are C. I. Pigment Blue 1, 1:2, 9, 14, 15, 15:1, 15:2, 15:3, 15:4, 15:6, 16, 17, 19, 25, 27, 28, 29, 33, 35, 36, 56, 56:1, 60, 61, 61:1, 62, 63, 66, 67, 68, 71, 72, 73, 74, 75, 76, 78, and 79.

Examples of green pigments are C. I. Pigment Green 1, 2, 4, 7, 8, 10, 13, 14, 15, 17, 18, 19, 26, 36, 45, 48, 50, 51, 54, 55, 58 or 59.

Examples of yellow pigments are C. I. Pigment Yellow 1, 1:1, 2, 3, 4, 5, 6, 9, 10, 12, 13, 14, 16, 17, 24, 31, 32, 34, 35, 35:1, 36, 36:1, 37, 37:1, 40, 41, 42, 43, 48, 53, 55, 61, 62, 62:1, 63, 65, 73, 74, 75, 81, 83, 87, 93, 94, 95, 97, 100, 101, 104, 105, 108, 109, 110, 111, 116, 117, 119, 120, 126, 127, 127:1, 128, 129, 133, 134, 136, 138, 139, 142, 147, 148, 150, 151, 153, 154, 155, 157, 158, 159, 160, 161, 162, 163, 164, 165, 166, 167, 168, 169, 170, 172, 173, 174, 175, 176, 180, 181, 182, 183, 184, 185, 188, 189, 190, 191, 191:1, 192, 193, 194, 195, 196, 197, 198, 199, 200, 202, 203, 204, 205, 206, 207, and 208.

Examples of violet pigments are C. I. Pigment Violet 1, 1:1, 2, 2:2, 3, 3:1, 3:3, 5, 5:1, 14, 15, 16, 19, 23, 25, 27, 29, 31, 32, 37, 39, 42, 44, 47, 49, and 50.

Examples of orange pigments are C. I. Pigment Orange 1, 2, 5, 13, 16, 17, 19, 20, 21, 22, 23, 24, 34, 36, 38, 39, 43, 46, 48, 49, 61, 62, 64, 65, 67, 68, 69, 70, 71, 72, 73, 74, 75, 77, 78, and 79.

Examples of black pigments are C. I. Pigment Black 7, 11, 30, 33.

If the respective products, especially the coating compositions, comprise fillers, these are, for example, the fillers known to those skilled in the art. Examples of pulverulent or fibrous fillers are, for example, those formed from pulverulent or fibrous particles of aluminum oxide, aluminum hydroxide, silicon dioxide, kieselguhr, siliceous earth, quartz, silica gel, talc, kaolin, mica, perlite, feldspar, ground shale, calcium sulfate, barium sulfate, calcium carbonate, calcite, dolomite, glass or carbon. The fibers used may be organic and/or inorganic in nature and may likewise be used as reinforcing agents. Further examples of pigments or fillers can be found, for example, in U.S. Pat. No. 4,795,796. It is likewise also possible for flame retardants, if the compounds of the invention are not already being used in customary additive amounts for this purpose, such as aluminum hydroxide or magnesium hydroxide, and flatting agents, such as silicas, to be dispersed and stabilized particularly efficiently by means of the inventive reaction products containing urethane and urea groups or the species of the general formula (I) that are present therein.

The inventive reaction products containing urethane and urea groups or the species of the general formula (I) that are present therein are especially also suitable for production of solids concentrates, such as pigment concentrates. For this purpose, the inventive reaction products containing urethane and urea groups or the species of the general formula (I) that are present therein are initially charged in a carrier medium, such as organic solvents, plasticizers and/or water, and the solids to be dispersed are added while stirring. In addition, these concentrates may comprise binders and/or other auxiliaries. However, it is especially possible to use the inventive reaction products containing urethane and urea groups or the species of the general formula (I) that are present therein to produce stable binder-free pigment concentrates. It is likewise possible to use the inventive reaction products containing urethane and urea groups or the species of the general formula (I) that are present therein to produce free-flowing solids concentrates from pigment presscakes. This is done by mixing the inventive reaction products containing urethane and urea groups or the species of the general formula (I) that are present therein into the presscake, which may still comprise organic solvents, plasticizers and/or water, and dispersing the mixture thus obtained. The solids concentrates produced in various ways can then be incorporated into different substrates, for example alkyd resins, polyester resins, acrylate resins, polyurethane resins or epoxy resins. Pigments can alternatively be dispersed in a solvent-free manner directly into the inventive reaction products containing urethane and urea groups or the species of the general formula (I) that are present therein, and are then particularly suitable for pigmentation of thermoplastic and thermoset plastics formulations.

It is likewise possible to use the inventive reaction products containing urethane and urea groups or the species of the general formula (I) that are present therein to provide products that increase the adhesion of coatings to substrates. For this purpose, for example, the inventive reaction products containing urethane and urea groups or the species of the general formula (I) that are present therein are mixed into the appropriate refinish coatings or overcoating paints (for example based on air-drying 2-component PU formulations or alkyd systems). The coating of a substrate, for example of an old paint or of a metal or plastic workpiece, is then effected under standard conditions, the use of the adhesion promoter making it possible to achieve a distinct improvement in adhesion on the substrate. The adhesion can generally be determined by means of the scratch test according to DIN 53230 or cross-cutting DIN EN ISO 2409, pull-off method according to DIN EN 24624, ball impact test, Erichsen test, mandrel bending test or steam jet test. Using the inventive reaction products containing urethane and urea groups or the species of the general formula (I) that are present therein, it is not necessary to subject either the formulation or the curing procedure to significant alterations. Nor is there any impairment in the most important properties of the finished varnish layer, such as degree of crosslinking, solvent resistance, gloss, leveling, resulting from the use of the inventive reaction products containing urethane and urea groups or the species of the general formula (I) that are present therein.

Use Amounts

According to the field of use, the inventive reaction products containing urethane and urea groups or the species of the general formula (I) that are present therein are used in such amounts that, in the product of ultimate interest for further use, there is preferably a proportion of the wetting agent and dispersant of the invention or of the adhesion promoter of the invention, of the inventive reaction products containing urethane and urea groups or of the species of the general formula (I) present therein of 0.01% to 10% by weight, based on the total amount of the respective product. Alternatively, higher proportions are possible.

Based on the solids to be dispersed, for example the pigment, the inventive reaction products containing urethane and urea groups or the species of the general formula (I) that are present therein are used in an amount of preferably 0.5% to 100% by weight. If solids that are difficult to disperse are used, the amount of wetting agent and dispersant of the invention used, the inventive reaction products containing urethane and urea groups or the species of the general formula (I) present therein, may quite possibly be higher. The amount is generally dependent on the surface area of the substance to be dispersed which is to be covered. A factor of significance may thus, for example, be what kind of pigment is involved. In general, it can be stated that less dispersant is usually needed for dispersion of inorganic pigments than for organic pigments, since the latter usually have a higher specific surface area and therefore a greater amount of dispersant is needed. Typical dosages of the wetting agent and dispersant, i.e. the inventive reaction products containing urethane and urea groups or the species of the general formula (I) that are present therein, are, for example, 1% to 20% by weight for inorganic pigments and 10% to 50% by weight for organic pigments, based in each case on the solids to be dispersed, especially the pigment. In the case of very finely divided pigments (for example some carbon blacks), even added amounts of 30% to 90% or may be advisable. Criteria employed for sufficient pigment stabilization may, for example, be gloss and transparency of the coating compositions or the degree of floating. The dispersion of the solids can be effected in the form of an individual dispersion or else as a mixed dispersion with multiple pigments at the same time, the best results generally being achievable in individual dispersions. In the case of use of mixtures of different solids, opposing charges on the surfaces of the solids may result in increased agglomeration in the liquid phase. In these cases, when the inventive reaction products containing urethane and urea groups or the species of the general formula (I) that are present therein are used, it is frequently possible to achieve the same charge, generally a positive charge, of all particles and hence to avoid instabilities resulting from differences in charge. The dispersants, i.e. the inventive reaction products containing urethane and urea groups or the species of general formula (I) that are present therein, achieve their optimal effect when added to the millbase, especially when the solid to be dispersed is at first mixed solely with the additive and optionally solvents ("premix"), since the additive can then be preferably adsorbed onto the surface of the solids without having to compete with the binder polymers. In practice, however, this course of action is necessary only in exceptional cases. If required, the inventive reaction products containing urethane and urea groups or the species of the general formula (I) that are present therein can also be used subsequently (as what are called "post-additives"), for example in order to solve floating or flocculation problems in a batch that has already been let down. In general, however, elevated additive dosages are required in this case.

The products, especially the coating compositions or varnishes in which the inventive reaction products containing urethane and urea groups or the species of the general formula (I) that are present therein are ultimately to display their effects, may additionally comprise an organic polymer as a further binder. Binders of this kind are known to those skilled in the art. This at least one further binder may be introduced, for example, via a letdown system which is mixed, for example, with a pigment concentrate comprising the inventive reaction products containing urethane and urea groups or the species of the general formula (I) that are present therein, such that the product in question is a pigmented varnish. Alternatively, other pigmented and/or filler-containing products are possible, for example plastics, sealants and further products based on an organic polymeric matrix that are known to those skilled in the art. A product is considered to be a system which comprises a polymeric resin or organic polymer as binder and hence is capable of forming a solid organic, polymeric matrix under suitable curing conditions (for example a coating composition). A product likewise refers to a system which, through simple mixing with a component comprising a binder, is capable of forming such an organic polymeric matrix (for example a pigment concentrate). Nonexclusive examples of materials used include the alkyd resins, polyester resins, acrylate resins, polyurethane resins, cellulose nitrates, cellulose acetobutyrates, melamines, chloro rubbers and/or epoxy resins that are known to those skilled in the art. Examples of water-based coatings are cathodic or anodic electrocoats, for example for automobile bodywork. Further examples are renders, silicate paints, disperse dyes, water-based varnishes based on water-thinnable alkyds, alkyd emulsions, hybrid systems, 2-component systems, polyurethane dispersions and acrylate dispersions.

Both 1-component systems and 2-component systems are possible, in which latter case there are generally also polyisocyanates, melamine resins and/or polyamide resins present as the typical crosslinking agents familiar to the person skilled in the art in a second component. Preference is given to product systems, especially coating compositions, comprising an acrylate resin as binder. A further variant concerns a 2-component (2K) coating composition or a 2K varnish comprising an epoxy resin in the binder component and a polyamide resin in the crosslinker component.

The coating compositions that are preferred as products may be water-based or solvent-based. "Water-based" is understood to mean that the coating composition comprises mainly water as solvent. More particularly, in the case of a water-based coating composition, preferably not more than 10% by weight of organic solvents, based on the total amount of solvents, is present in the coating composition. A solvent-based coating composition is considered to be one that contains not more than 5% by weight, preferably not more than 2% by weight, of water, based on the total amount of solvents.

Useful further product components include, for example, photoinitiators, defoamers, wetting agents, film-forming auxiliaries, such as cellulose derivatives (for example cellulose nitrates, cellulose acetates, cellulose acetobutyrate), reactive diluents, leveling agents, dispersants and/or rheology control additives.

The production of the pigment concentrates and coating composition that are preferred as products is effected via methods familiar to those skilled in the art. The known methods are used, for example stepwise addition with stirring and mixing of the constituents of the coating composition in customary mixing units, such as stirred tanks or dissolvers.

Using the preferred pigment concentrates and coating compositions, it is possible to produce coatings or varnish layers. The coating is produced via techniques of application to a substrate that are familiar to those skilled in the art and subsequent curing methods.

Application is effected, for example, by the known injecting, spraying, painting, rolling, pouring, impregnating and/ or dipping methods. The application of the coating composition to a substrate is followed by curing or drying by standard methods. For example, the coating composition applied may be curable by physical drying, by thermal means and/or with application of actinic radiation (radiative curing), preferably UV radiation and electron beams. Thermal curing can be effected, for example, in the range from about 10° C. to about 400° C., according to the nature of the coating composition and/or of the substrate. The duration of curing is also individually dependent, for example, on the nature of the curing method (thermal or actinic), the nature of the coating composition used and/or the substrates. The substrate here may be moving or else at rest.

As well as the above-described application as a dispersant and/or coating for pulverulent and fibrous solids, the inventive reaction products containing urethane and urea groups or the species of the general formula (I) that are present therein may also be used as adhesion promoters.

As well as the above-described applications as dispersants and/or adhesion promoters and/or coating compositions for pulverulent and fibrous solids, the inventive reaction products containing urethane and urea groups or the species of the general formula (I) that are present therein may also be used as viscosity reducers and compatibilizers in synthetic resins. Examples of synthetic resins of this kind are what are called the "sheet molding compounds" (SMCs) and "bulk molding compounds" (BMCs), which consist of unsaturated polyester resins with a high filler and fiber content. The production and processing thereof is described by way of example in U.S. Pat. No. 4,777,195. A problem with SMC and BMC synthetic resin mixtures is that polystyrene (PS) is often added to the formulation in order to reduce shrinkage during the processing operation. PS is incompatible with the unsaturated polyester resins used, and the components separate. In the case of use of PS-filled SMC or BMC mixtures, the inventive reaction products containing urethane and urea groups or the species of the general formula (I) that are present therein, because of their good dispersion qualities, can bring about compatibilization between PS and unsaturated polyester resin, which increases the storage stability and processing reliability of such mixtures.

By means of the inventive reaction products containing urethane and urea groups or the species of the general formula (I) that are present therein, it is possible to achieve phase transfer effects, for example, in incompatible polyol mixtures, polyol-isocyanate mixtures or polyol-blowing agent mixtures (as used, for example, in polyurethane production).

The present invention is additionally elucidated hereinafter by examples which follow.

EXAMPLES

In the case of molecularly inhomogeneous substances, the stated molecular weights are number-average values. The molecular weights or number-average molecular weights $M_n$, in the event that titratable hydroxyl or amino groups are present, are determined by end group determination via the finding of the OH number or the amine number. In the case of compounds to which end group determination is not applicable, the number-average molecular weight is determined by means of gel permeation chromatography against a polystyrene standard.

Unless stated otherwise, figures in parts are parts by weight and figures in percent are percent by weight.

Solids Content

The sample (2.0±0.1 g of test substance) is weighed into an aluminum dish that has been dried beforehand and dried in a drying cabinet at 150° C. for 10 minutes, cooled down in a desiccator, and then re-weighed. The residue corresponds to the solids content.

NCO Number

The free NCO content of the polyisocyanates being used and the course of reaction of the NCO additions is determined according to EN ISO 9369 by reaction with butylamine and subsequent titration of the excess of amine. These methods are also described in Saul Patai "The Chemistry of Cyanates and their Thioderivates", Part 1, Chapter 5, 1977.

OH Number

The OH number is determined according to DIN ISO 4629 by acetylation with an excess of acetic anhydride. Subsequently, the excess acetic anhydride is hydrolyzed to acetic acid by addition of water and back-titrated with ethanolic KOH solution. The OH number indicates the amount of KOH in mg equivalent to the amount of acetic acid bound in the acetylation of 1 g of substance.

Amine Number

The amine number (AN) is understood to mean the amount of KOH in mg corresponding to the amine content of 1 g of substance. The amine number is determined according to DIN 16945 by potentiometric titration with 0.1 N perchloric acid in acetic acid.

Starting Materials

| | |
|---|---|
| Desmodur HL BA | isocyanurates based on HDI and TDI, 60% in butyl acetate, % NCO = 10.6; manufacturer: Bayer Material Science |
| Desmodur N 100A | biuret based on HDI, 100%, % NCO = 22.0; manufacturer: Bayer Material Science |
| Desmodur N 3400 | uretdione based on HDI, 100%, % NCO = 21.8; manufacturer: Bayer Material Science |
| Desmodur IL BA | isocyanurates based on TDI, 51% in butyl acetate, % NCO = 8.0; manufacturer: Bayer Material Science |
| TDI | tolyl 2,4-diisocyanate, % NCO = 48.3; manufacturer: Bayer Material Science |
| HDI | hexamethylene 1,6-diisocyanate, % NCO = 49.9; manufacturer: Bayer Material Science |
| MPA | methoxypropyl acetate (solvent), manufacturer: Dow Chemical Comp. |
| DMSO | dimethyl sulfoxide (solvent), supplier: Sigma-Aldrich |
| NFM | N-formylmorpholine (solvent), manufacturer: BASF |
| DBTL | dibutyltin dilaurate, manufacturer: Merck |
| DMAPA | N,N-dimethylaminopropylamine, manufacturer: Huntsman Corp. |
| TEA | triethanolamine, manufacturer: BASF |
| DEEA | N,N-diethylethanolamine, manufacturer: Dow Chemical Comp. |
| MEA | N-methylethanolamine, manufacturer: BASF |
| DEA | N,N-diethanolamine, manufacturer: BASF |
| IPA | 3-imidazolyl-1-propylamine, manufacturer: BASF |
| 4MDETA | N,N,N',N'-tetramethyldiethylenetriamine = Jeffcat Z 130, manufacturer: Huntsman Corp. |
| DMAE | N,N-dimethylaminoethanol, manufacturer: BASF |
| DEEA | N,N-diethylethanolamine, manufacturer: BASF |
| DMEA | N,N-dimethylethanolamine, manufacturer: BASF |
| GLY | glycerol, manufacturer: Merck |
| Jeffcat DPA | N-(3-dimethylaminopropyl)-N,N-diisopropanol-1-ylamine, manufacturer: Huntsman Corp. |
| BGA | benzoguanamine (2,4-diamino-6-phenyl-1,3,5-triazine), manufacturer: Nippon Shokubai |
| AGA | acetoguanamine (2,4-diamino-6-methyl-1,3,5-triazine), supplier: Sigma-Aldrich |
| 2,6-DAP | 2,6-diaminopyridine, supplier: Sigma-Aldrich |
| melamine | 2,4,6-triamino-1,3,5-triazine, supplier: Helm AG |
| guanine | 2-amino-6-oxopurine, supplier: Sigma-Aldrich |
| Grilonit RV 1814 | $C_{13}/C_{15}$-alkyl glycidyl ether, manufacturer: EMS-Chemie |

General Preparation Method for Preparation of the Urethanes of the General Formula (V) (table 1):

A four-neck flask provided with a stirrer, thermometer, dropping funnel, reflux condenser and nitrogen inlet tube is initially charged with 430 g of a diisocyanate R(NCO)$_2$ Desmodur T100 (about 100% tolylene 2,4-diisocyanate, NCO content=48.8) and 7 g of benzoyl chloride, which are mixed thoroughly. X g of the alcohol Y—(OH)$_q$ which is anhydrous, and alkali-free in the case of polyethers, are metered in gradually such that the temperature does not exceed 55° C. After the metered addition, the mixture is stirred at 55° C. for a further 3 hours. The excess TDI is removed from the reaction mixture by means of a thin-film evaporator at 150° C. The residual TDI content is <1%. The urethanes of the general formula (V) are identified by serial numbers preceded by M in the table below.

TABLE 1

Overview of the urethanes of the general formula (V) M1 to M49

| Urethane of the formula (III) | Alcohol Y-(OH)$_q$ | Amount X in [g] |
|---|---|---|
| M1 | Y1 butanol-started PO polyether Mn 800, OH number: 70 mg KOH/g | 800 |
| M2 | Y2 MPEG 350, OH number: 162 mg KOH/g | 350 |
| M3 | Y3 butanol-started EO/PO polyether (EO:PO 1:1) Mn 2240, OH number: 25 mg KOH/g | 2240 |
| M4 | Y4 polyester, OH number: 72 mg KOH/g (for preparation see below) | 780 |
| M5 | Y5 hexadecanol-started monohydroxy-functional epsilon-caprolactone polyester, Mn 600 | 600 |
| M6 | Y6 hexadecanol-started monohydroxy-functional epsilon-caprolactone polyester, Mn 1200 | 1200 |
| M7 | Y7 MPEG 500 = methoxy polyethylene glycol, Mn 500 | 500 |
| M8 | Y8 butanol-started EO/PO polyether (EO:PO 1:1) Mn 1100 | 1100 |
| M9 | Y9 butanol-started EO/PO polyether (EO:PO 1:1) Mn 1700 | 1700 |
| M10 | Y10 butanol-started EO/PO polyether (EO:PO 1:1) Mn 2000 | 2000 |
| M11 | Y11 butanol-started EO/PO polyether (EO:PO 1:1) Mn 3100 | 3100 |
| M12 | Y12 butanol-started EO/PO polyether (EO:PO 1:1) Mn 4800 | 4800 |
| M13 | Y13 hydroxyethyl acrylate-started epsilon-caprolactone polyester; Mn 1200 | 1200 |
| M14 | Y14 monohydroxy-functional hydroxypropyl polydimethylsiloxane with butyl end group, Mn 1200 | 1200 |
| M15 | Y15 methanol-started EO/PO polyether (EO:PO 3:1) Mn 1400 | 1400 |
| M16 | Y16 MPEG 500-started epsilon-caprolactone polyester; Mn 900 | 900 |
| M17 | Y17 isodecanol-started epsilon-caprolactone polyester Mn 700 | 700 |
| M18 | Y18 isodecanol-started epsilon-caprolactone polyester Mn 1000 | 1000 |
| M19 | Y19 monophenyl glycol-started epsilon-caprolactone polyester; Mn 1200 | 1200 |
| M20 | Y20 n-butanol-started epsilon-caprolactone polyester, Mn 600 | 600 |
| M21 | Y21 n-butanol-started epsilon-caprolactone polyester, Mn 1200 | 1200 |
| M22 | Y22 n-butanol-started PO polyether, Mn 1100 | 1100 |
| M23 | Y23 isodecanol-started polyester formed from epsilon-caprolactone and delta-valerolactone in a molar ratio of 3:1; Mn = 2000 | 2000 |
| M24 | Y24 B11/50-started epsilon-caprolactone polyester; Mn = 2000 | 2000 |
| M25 | Y25 MPEG 350-started epsilon-caprolactone polyester; Mn 900 | 900 |
| M26 | Y26 MPEG 350-started polyester formed from epsilon-caprolactone and delta-valerolactone in a molar ratio of 3:1; Mn 950 | 950 |
| M27 | Y27 MPEG 500-started polyester formed from epsilon-caprolactone and delta-valerolactone in a molar ratio of 3:1; Mn 1100 | 1100 |
| M28 | Y28 MPEG 750-started polyester formed from epsilon-caprolactone and delta-valerolactone in a molar ratio of 3:1; Mn = 1400 | 1400 |
| M29 | Y29 MPEG 750 | 750 |
| M30 | Y30 epsilon-caprolactone polyester Mn 1600, started with a methanol-started EO/PO polyether (EO:PO 3:1); Mn 1400 | 1600 |
| M31 | Y31 butanol-started EO/PO polyether (EO:PO 1:1); Mn 3170 | 3170 |
| M32 | Y32 butanol-started EO/PO polyether (EO:PO 1:1); Mn 2540 | 2540 |
| M33 | Y33 n-butanol-started PO polyether; Mn 2240 | 2240 |
| M34 | Y34 n-butanol-started butylene oxide polyether; Mn 960 | 960 |
| M35 | Y35 alpha,omega-dihydroxy-functional hydroxypropyl-polydimethylsiloxane; Mn 1800 | 1800 |
| M36 | Y36 dihydroxy-functional epsilon-caprolactone polyester Mn 2800, started with an alpha,omega-dihydroxy-functional hydroxypropyl-polydimethylsiloxane; Mn 900 | 2800 |
| M37 | Y37 oleyl alcohol | 268 |
| M38 | Y38 monophenyl glycol | 138 |
| M39 | Y39 isotridecyl alcohol | 200 |
| M40 | Y40 n-decanol | 158 |
| M41 | Y41 isodecanol | 158 |
| M42 | Y42 benzyl alcohol | 108 |
| M43 | Y43 cyclohexanol | 100 |
| M44 | Y44 isobutanol | 74 |
| M45 | Y45 polyethylene glycol (dihydroxy-functional); Mn 600 | 300 |
| M46 | Y46 polyethylene glycol (dihydroxy-functional); Mn 1000 | 500 |

TABLE 1-continued

Overview of the urethanes of the general formula (V) M1 to M49

| Urethane of the formula (III) | Alcohol Y-(OH)$_q$ | Amount X in [g] |
|---|---|---|
| M47 | Y47 dipropylene glycol monomethyl ether | 148 |
| M48 | Y48 butyltriglycol | 206 |
| M49 | Y49 isodecanol-started polyester formed from epsilon-caprolactone and delta-valerolactone in a molar ratio of 3:1; Mn 1400 | 1400 |

Preparation of the Polyether-Polyester Y4; Mn 780

350 g of MPEG 350 (methoxy polyethylene glycol, Mn 350), 434 g of epsilon-caprolactone and 1 g of DBTL (dibutyltin dilaurate) are reacted at 160° C. until a solids content of >95% has been attained.

The OH number of the reaction product is 72 mg KOH/g.

Preparation of a Siloxane-Containing Epsilon-Caprolactone Polyester Y36, Mn 2800

35 g of an alpha,omega-dihydroxyalkyl-functional dimethylpolysiloxane with $M_n$ about 900 g/mol are reacted with 75 g of epsilon-caprolactone. For this purpose, the mixture with addition of 0.035 g of DBTL is left to react at 160° C. in an N2 atmosphere for about 8 hours. The reaction has ended when there is a solids content of >98%. The alpha, omega-hydroxyalkyl-functional dimethylpolysiloxane as starter alcohol is obtained in a known manner, by addition of suitable unsaturated alcohols (for example the allyl alcohol used in this example) onto dimethylpolysiloxanes bearing terminal silane units.

General Method for Reaction of the Urethanes M of the General Formula (V) with Species of General Formula (IIa) to Give Reaction Products MA Containing Urethane and Urea Groups, Comprising at Least One Species of the General Formula (I) (Table 2):

A four-neck flask equipped with a stirrer, thermometer, dropping funnel, reflux condenser and nitrogen inlet tube is initially charged with x g of urethane M of the formula (V) and heated to 80° C. while stirring under nitrogen. Subsequently, $y^1$ g of a component of the general formula (IIa) or of the mixture of $y^1$ g of a component of the general formula (IIa) and $y^2$ g of a component of the general formula (III) are added and the reaction temperature is raised to 120° C. Turbidity may arise, which dissolves in the course of the reaction. The progress of the reaction is followed by means of titrimetric determination of the NCO number to EN ISO 9369. A small amount $y^2$ (in g) of an optional component of the general formula (III) can also be added after the main reaction, in order to fully convert residual amounts of isocyanate and to obtain particularly storage-stable products. Dilution with MPA is optionally possible during or after the reaction.

The reaction products containing urethane and urea groups, comprising at least one species of the general formula (I), are identified hereinafter by serial numbers preceded by MA.

TABLE 2

Overview of the products MA1 to MA60

| Example | Amount x of urethane of the general formula (V) | Amount $y^1$ of a component of the general formula (IIa) | Amount $y^2$ of an optional component of the general formula (III) | MPA in g | NCO number | Solids in % |
|---|---|---|---|---|---|---|
| MA1 | 90.1 g M1 | 10.50 g BGA | 0.2 g TEA | | 0.01 | 99.2% |
| MA2 | 90.0 g M8 | 7.65 g BGA | 0.2 g TEA | | 0.01 | 99.8% |
| MA3 | 90.2 g M9 | 4.96 g BGA | 0.2 g TEA | | 0.01 | 99.8% |
| MA4 | 90.2 g M4 | 10.48 g BGA | 0.2 g TEA | 64.2 g | 0.01 | 60% |
| MA5 | 90.1 g M6 | 7.04 g BGA | 0.2 g TEA | 63.8 g | <0.01 | 61% |
| MA6 | 90.0 g M27 | 7.63 g BGA | 0.2 g TEA | 64.0 g | 0.01 | 60% |
| MA7 | 90.3 g M33 | 3.75 g BGA | 0.2 g TEA | | <0.01 | 99.1% |
| MA8 | 89.5 g M19 | 7.03 g BGA | 0.2 g TEA | 64.7 g | <0.01 | 60% |
| MA9 | 91.2 g M1 | 6.10 g 2,6-DAP | 0.2 g DEA | | 0.01 | 99.3% |
| MA10 | 90.0 g M8 | 4.44 g 2,6-DAP | 0.2 g DEA | | <0.01 | 98.1% |
| MA11 | 90.5 g M9 | 2.85 g 2,6-DAP | 0.2 g DEA | | 0.01 | 99.2% |
| MA12 | 90.1 g M4 | 6.11 g 2,6-DAP | 0.2 g DEA | | 0.01 | 99.8% |
| MA13 | 90.2 g M6 | 4.08 g 2,6-DAP | 0.2 g DEA | | 0.01 | 99.8% |
| MA14 | 89.7 g M27 | 4.43 g 2,6-DAP | 0.2 g DEA | | 0.01 | 99.3% |
| MA15 | 90.1 g M33 | 2.18 g 2,6-DAP | 0.2 g DEA | | <0.01 | 98.1% |
| MA16 | 90.3 g M19 | 4.08 g 2,6-DAP | 0.2 g DEA | | 0.01 | 99.2% |
| MA17 | 89.8 g M1 | 20.91 g BGA | 0.1 g MEA | | 0.01 | 99.8% |
| MA18 | 90.3 g M8 | 14.72 g BGA | 0.1 g MEA | | 0.01 | 99.8% |
| MA19 | 90.0 g M9 | 9.88 g BGA | 0.1 g TEA | | 0.01 | 99.3% |
| MA20 | 90.1 g M4 | 20.94 g BGA | 0.1 g DEEA | | <0.01 | 98.1% |
| MA21 | 90.2 g M6 | 14.01 g BGA | 0.1 g TEA | | 0.01 | 99.2% |
| MA22 | 89.6 g M12 | 3.48 g BGA | 0.1 g TEA | | 0.01 | 99.8% |
| MA23 | 90.1 g M33 | 7.35 g BGA | 0.2 g 4MDETA | | 0.01 | 99.8% |
| MA24 | 90.0 g M19 | 14.06 g BGA | 0.1 g DMAPA | | 0.01 | 99.3% |
| MA25 | 90.1 g M1 | 6.10 g 2,6-DAP | 0.2 g DEA | | <0.01 | 98.1% |
| MA26 | 90.1 g M8 | 4.44 g 2,6-DAP | 0.2 g DEEA | | 0.01 | 99.2% |

TABLE 2-continued

Overview of the products MA1 to MA60

| Example | Amount x of urethane of the general formula (V) | Amount $y^1$ of a component of the general formula (IIa) | Amount $y^2$ of an optional component of the general formula (III) | MPA in g | NCO number | Solids in % |
|---|---|---|---|---|---|---|
| MA27 | 90.2 g M9 | 2.85 g 2,6-DAP | 0.2 g DEA | | 0.01 | 99.8% |
| MA28 | 89.7 g M4 | 6.11 g 2,6-DAP | 0.2 g TEA | | 0.01 | 99.8% |
| MA29 | 89.9 g M6 | 4.08 g 2,6-DAP | 0.2 g MEA | | 0.01 | 99.3% |
| MA30 | 90.3 g M27 | 4.43 g 2,6-DAP | 0.2 g DEA | | <0.01 | 98.1% |
| MA31 | 90.1 g M33 | 2.18 g 2,6-DAP | 0.2 g DEA | | 0.01 | 99.2% |
| MA32 | 89.6 g M19 | 4.08 g 2,6-DAP | 0.2 g 4MDETA | | 0.01 | 99.8% |
| MA33 | 90.0 g M1 | 12.09 g 2,6-DAP | 0.1 g BzA | | 0.01 | 99.8% |
| MA34 | 90.2 g M8 | 8.81 g 2,6-DAP | 0.1 g IPA | | 0.01 | 99.3% |
| MA35 | 90.1 g M9 | 5.62 g 2,6-DAP | 0.1 g TEA | | <0.01 | 98.1% |
| MA36 | 90.1 g M4 | 12.05 g 2,6-DAP | 0.1 g TEA | | 0.01 | 99.2% |
| MA37 | 90.2 g M6 | 8.04 g 2,6-DAP | 0.1 g DMAPA | | 0.01 | 99.8% |
| MA38 | 90.2 g M27 | 8.80 g 2,6-DAP | 0.1 g DEA | | 0.01 | 99.8% |
| MA39 | 90.0 g M33 | 4.35 g 2,6-DAP | 0.1 g MEA | | 0.01 | 99.3% |
| MA40 | 89.9 g M19 | 8.12 g 2,6-DAP | 0.1 g DEA | | <0.01 | 98.1% |
| MA41 | 90.3 g M8 | 5.10 g AGA | 0.2 g DEA | 95.6 g DMSO | 0.01 | 50.2% |
| MA42 | 90.0 g M9 | 3.30 g AGA | 0.2 g DEA | 91.6 g DMSO | 0.01 | 50.8% |
| MA43 | 90.1 g M4 | 7.02 g AGA | 0.2 g DEA | 95.1 g DMSO | 0.01 | 49.8% |
| MA44 | 90.2 g M6 | 4.68 g AGA | 0.2 g DEA | 93.6 g DMSO | 0.01 | 50.3% |
| MA45 | 90.0 g M27 | 5.09 g AGA | 0.2 g DEEA | 94.5 g DMSO | <0.01 | 48.1% |
| MA46 | 89.8 g M8 | 10.15 g AGA | 0.1 g DEA | 98.6 g DMSO | 0.01 | 50.2% |
| MA47 | 90.1 g M9 | 6.55 g AGA | 0.1 g DEA | 96.6 g DMSO | 0.01 | 49.8% |
| MA48 | 90.0 g M4 | 13.90 g AGA | 0.1 g DEA | 113.2 g DMSO | <0.01 | 50.1% |
| MA49 | 90.3 g M6 | 9.30 g AGA | 0.1 g DEA | 99.0 g DMSO | <0.01 | 50.3% |
| MA50 | 90.0 g M27 | 10.04 g AGA | 0.1 g DEA | 100.6 g DMSO | <0.01 | 49.1% |
| MA51 | 90.1 g M4 | 16.97 g guanine | 0.1 g DEEA | | <0.01 | 99.2% |
| MA52 | 90.0 g M6 | 11.31 g guanine | 0.1 g DEA | | 0.01 | 99.8% |
| MA53 | 90.4 g M27 | 12.34 g guanine | 0.1 g DEA | | 0.01 | 99.8% |
| MA54* | 90.1 g M9 | 5.35 g DMAPA | 0.1 g TEA | | <0.01 | 99.0% |
| MA55* | 90.2 g M9 | 6.55 g IPA | 0.1 g TEA | | <0.01 | 99.3% |
| MA56* | 90.0 g M9 | 4.70 g DMAE | 0.1 g TEA | | <0.01 | 99.0% |
| MA57* | 90.1 g M9 | 8.40 g 4MDETA | | | <0.01 | 99.4% |
| MA58* | 90.1 g M9 | 7.92 g TEA | | | <0.01 | 99.6% |
| MA59 | 90.1 g M9 | 6.65 g melamine | | 9.6 g NFM | 0.01 | 90.1% |
| MA60 | 90.3 g M9 | 6.60 g melamine | 0.1 g GLY | 9.5 g NFM | 0.01 | 91.1% |

*not in accordance with the invention

General Method for Preparation of a Reaction Product Containing Urethane and Urea Groups, Comprising at Least One Species of the General Formula (I), from $R(NCO)_x$ and $Y-(OH)_q$ (table 3):

A reaction vessel provided with a stirrer, thermometer, reflux condenser and nitrogen inlet tube is initially charged with x g of a polyisocyanate $R(NCO)_x$ together with $y^3$ g of an alcohol $Y-(OH)_q$, which are heated at 50° C. while stirring under nitrogen. After the addition of 0.008 wt % of DBTL based on the amount of the polyisocyanate $R(NCO)_x$, the reaction temperature is increased to 70° C. Subsequently, $y^1$ g of a species of the general formula (IIa) are added and the reaction temperature is raised to 95° C. The progress of the reaction is still followed by means of titrimetric determination of the NCO number to EN ISO 9369. The conversion of the polyisocyanate $R(NCO)_x$ is completed or, if appropriate, further aminic bonding groups are introduced by adding to the mixture—in the case of the presence of residual NCO groups after the reaction with the species of the general formula (IIa)—$y^2$ g of a component of the general formula (III). The reaction has ended when, by titrimetric determination of the NCO number to EN ISO 9369, an NCO value of <0.01 is determined. Dilution with MPA is optionally possible during or after the reaction.

TABLE 3

Overview of the products MA61 to MA85

| Example | Amount x of $R(NCO)_x$ | Amount $y^3$ of $Y\text{-}(OH)_q$ | Amount $y^1$ of a component of the general formula (IIa) | Amount $y^2$ of an optional component of the general formula (III) | MPA in g | NCO number | Solids in % |
|---|---|---|---|---|---|---|---|
| MA61 | 10.50 g Desmodur HL BA | 13.8 g Y1 | 1.75 g BGA | | 17.8 | <0.01 | 50 |
| MA62 | 10.52 g Desmodur HL BA | 13.9 g Y1 | 1.15 g AGA | | 17.7 | <0.01 | 50 |
| MA64 | 10.51 g Desmodur HL BA | 13.8 g Y1 | 1.00 g 2,6-DAP | | 17.9 | <0.01 | 50 |
| MA65 | 17.45 g TDI | 61.1 g Y18 | 6.15 g BGA | 1.06 g TEA | 85.0 | <0.01 | 50 |
| MA66 | 17.44 g TDI | 57.3 g Y18 | 4.85 g 2,6-DAP | | 84.8 | <0.01 | 50 |
| MA67 | 17.41 g TDI | 60.85 g Y18 | 4.12 g AGA | 1.08 g TEA | 85.7 | <0.01 | 50 |
| MA68 | 20.1 g Desmodur N 100A | 378.8 g Y12 | 3.75 g BGA | 1.0 g DEEA | 403.0 g | <0.01 | 50 |
| MA69 | 20.0 g Desmodur N 100A | 377.5 g Y12 | 2.51 g AGA | 1.0 g DEEA | 401.7 g | <0.01 | 50 |
| MA70 | 20.1 g Desmodur N 100A | 379.0 g Y12 | 3.02 g guanine | 1.0 g DEEA | 402.9 g | <0.01 | 50 |
| MA71 | 20.2 g Desmodur N 100A | 378.0 g Y12 | 2.52 g melamine | | 402.1 g | <0.01 | 50 |
| MA72 | 20.5 g Desmodur N 3400 | 81.9 g Y18 | 3.74 g BGA | 1.0 g DEEA | 101.6 g | <0.01 | 50 |
| MA73 | 20.6 g Desmodur N 3400 | 82.1 g Y18 (0.08 mol) | 2.18 g 2,6-DAP | 1.0 g DEEA | 102.2 g | <0.01 | 50 |
| MA74 | 20.5 g Desmodur N 3400 | 82.0 g Y18 | 2.51 g melamine | 1.0 g DEEA | 101.8 g | <0.01 | 50 |
| MA75 | 20.4 g Desmodur N 3400 | 82.4 g Y18 | 3.01 g guanine | 1.0 g DEEA | 102.0 g | <0.01 | 50 |
| MA76 | 24.15 g Desmodur IL BA | 30.37 g Y18 | 3.75 g BGA | | 34.1 | <0.01 | 50 |
| MA77 | 24.20 g Desmodur IL BA | 30.40 g Y18 | 2.50 g AGA | | 33.6 | <0.01 | 50 |
| MA78 | 24.15 g Desmodur IL BA | 30.41 g Y18 | 2.16 g 2,6-DAP | | 33.8 | <0.01 | 50 |
| MA79 | 24.17 g Desmodur IL BA | 30.39 g Y18 | 2.50 g melamine | | 33.5 | <0.01 | 50 |
| MA80 | 24.16 g Desmodur IL BA | 41.71 g Y18 | 1.86 g BGA | | 38.3 | <0.01 | 50 |
| MA81 | 24.15 g Desmodur IL BA | 46.30 g Y18 | 0.92 g BGA | | 48.0 | <0.01 | 50 |
| MA82 | 24.21 g Desmodur IL BA | 19.31 g Y18 7.02 g Y2 | 3.72 g BGA | | 34.1 | <0.01 | 50 |
| MA83 | 24.12 g Desmodur IL BA | 19.29 g Y18 1.52 g Y45 | 3.75 g BGA | | 25.0 | <0.01 | 50 |
| MA84 | 24.17 g Desmodur IL BA | 19.33 g Y18 2.89 g Y37 | 3.74 g BGA | | 26.3 | <0.01 | 50 |
| MA85* | 17.71 g TDI | 61.23 g Y49 | 20.05 g Jeffcat DPA | | 99.3 | 0.01 | 50 |

*not in accordance with the invention

General Method for Quaternization (Table 4):

In a four-neck flask provided with a stirrer, thermometer, dropping funnel, reflux condenser and nitrogen inlet tube, the starting compound in 40 g of MPA (methoxypropyl acetate) and 40 g of butylglycol and $z^1$ g of alkylating reagent are reacted at 120° C. for 4 h. The solids content is adjusted to 40% with a 1:1 mixture of MPA and butylglycol.

TABLE 4

Quaternization

| Example | Starting compound | $z^1$ g of alkylating reagent |
|---|---|---|
| MAQ1 | 798.2 g MA68 | 0.9 g benzyl chloride |
| MAQ2 | 205.5 g MA73 | 1.8 g Grilonit 1814 |
|  |  | 0.8 g benzoic acid |
| MAQ3 | 93.8 g MA32 | 0.3 g benzyl chloride |
| MAQ4 | 45.4 g MA19 | 0.4 g Grilonit 1814 |
|  |  | 0.2 g benzoic acid |
| MAQ5* | 185.0 g MA85* | 9.4 g benzyl chloride |

General Method for Salt Formation (Table 5):

In a four-neck flask provided with a stirrer, thermometer, dropping funnel, reflux condenser and nitrogen inlet tube, the starting compound in 40 g of MPA and 35 g of butylglycol is stirred with $z^2$ g of salt conversion reagent at 60° C. for 1 h.

TABLE 5

Salt formation

| Example | Starting compound | $z^2$ g of salt conversion reagent |
|---|---|---|
| MAS1 | 89.1 g MA3 | 2.6 g tall oil fatty acid |
| MAS2 | 91.0 g MA3 | 1.0 g benzoic acid |
| MAS3 | 87.2 g MA3 | 11.5 g MPEG500 monophosphate |
| MAS4 | 89.8 g MA3 | 10.4 g MPEG500 monosuccinate |
| MAS5 | 85.1 g MA3 | 0.5 g of lactic acid |
| MAS6 | 95.1 g MA78 | 5.6 g tall oil fatty acid |
| MAS7 | 94.8 g MA78 | 2.3 g benzoic acid |
| MAS8 | 95.2 g MA78 | 11.2 g MPEG500 monophosphate |
| MAS9 | 95.0 g MA78 | 12.3 g MPEG500 monosuccinate |
| MAS10 | 95.6 g MA78 | 1.6 g of lactic acid |

Performance Testing

Use of the inventive reaction products containing urethane and urea groups, comprising at least one species of the general formula (I), as wetting and dispersing additives for production of pigment concentrates and use thereof in paint systems.

Starting Materials

| | |
|---|---|
| Paraloid B-66 | thermoplastic acrylate resin, manufacturer: DOW Chemicals |
| Vinnol E 15/45 | copolymer resin based on vinyl chloride and vinyl acetate, manufacturer: Wacker Chemie |
| NC E 510 | nitrocellulose, manufacturer: Dow Wolff Cellulosics GmbH |
| Vialkyd AC 433 75% | alkyd resin, manufacturer: Allnex |
| Epikote 1001 75% | epoxy resin based on bisphenol A, manufacturer: Hexion |
| Aradur 115 X 70 | polyamidoamine, manufacturer: Huntsman |
| Joncryl 500 | hydroxy-functional acrylic resin, manufacturer: BASF |
| Laropal A 81 | aldehyde resin, manufacturer: BASF |
| Dynapol LH 830 (60%) | polyester resin in solvent naphtha and butylglycol, manufacturer: Evonik |
| Dynapol 1203 (50%) | nonionic protected sulfonic acid catalyst, 50% in xylene, manufacturer: Evonik |
| Cymel 303 | amino crosslinker, manufacturer: Allnex |
| Nacure 2500 | p-toluenesulfonic acid, manufacturer: King Industries |
| DIDP | diisodecyl phthalate |
| MAK | methyl amyl ketone, manufacturer: Eastman |
| Dowanol PMA | propylene glycol methyl ether acetate, manufacturer: Dow Chemicals |
| Dowanol PM | propylene glycol methyl ether, manufacturer: Dow Chemicals |
| Starsol (DBE) | dibasic ester, manufacturer: DuPont |
| butyldiglycol acetate | butyldiglycol acetate, manufacturer: BASF |
| Solvesso 150ND | aromatic hydrocarbons, 180-193° C. fraction, manufacturer: ExxonMobil |
| Aerosil R972 | hydrophobized fumed silica, manufacturer: Evonik |
| Raven 5000 Ultra III | carbon black pigment for high jetness, manufacturer: Birla Carbon |
| Paliogen Red L3880 HD | perylene red pigment, manufacturer: BASF |
| Hostaperm RL NF | violet pigment, manufacturer: Clariant |
| InkJet Margenta E02 | pigment for inkjet inks, manufacturer: Clariant |
| Novoperm Yellow P-M3R | isoindoline pigment, manufacturer: Clariant |
| Nipex 160 IQ | gas black with primary particle size 20 nm, manufacturer: Degussa |
| Bayferrox Red 130M | iron oxide red (P.R. 101), manufacturer: Lanxess |
| Heliogen Blue L7101F | phthalocyanine blue (P.B. 15:4), manufacturer: BASF |
| Hostaperm Pink E | quinacridone red (P.R. 122), manufacturer: Clariant |
| Heliogen Green L8735 | phthalocyanine-copper, halogenated (P.G. 7), manufacturer: BASF |
| Colour Black FW200 | carbon black pigment (P. Bk. 7), manufacturer: Orion |
| Special black 100 | oxidized furnace black, manufacturer: Orion Engineered Carbons |
| Tiona 696 | $TiO_2$ pigment, manufacturer: Cristal |
| BYK 325 | substrate wetting agent, manufacturer: BYK-Chemie |
| BYK 310 | substrate wetting agent, manufacturer: BYK-Chemie |
| BYK 306 | substrate wetting agent, manufacturer: BYK-Chemie |
| BYK-358N | leveling agent, manufacturer: BYK-Chemie |
| BYK-057 | defoamer additive, manufacturer: BYK-Chemie |
| DISPERBYK 170 | dispersant, manufacturer: BYK-Chemie |

Procedures

Production of the TPA Pigment Dispersion

The Paraloid B-66 dispersion resin, solvent, dispersing additive and pigment were weighed into 100 mL glass bottles so as to obtain 50 g of millbase. Subsequently, 50 g of glass beads (1 mm) were weighed in.

Composition of the TPA Pigment Concentrates (Figures in g)

| | TPA 1 (black) | TPA 2 (red) | TPA 3 (violet) |
|---|---|---|---|
| Paraloid B-66 (50% in xylene) | 24.0 | 24.0 | 24.0 |
| Raven Ultra 5000 III | 6.0 | | |
| Paliogen Red L 3880 HD | | 8.0 | |
| Hostaperm RL-NF | | | 5.0 |
| Dispersant (100%/50%) | 4.2/8.4 | 2.0/4.0 | 2.0/4.0 |
| n-Butanol | 5.0 | 5.0 | 5.0 |
| PMA by solids content of the dispersing additive (100%/50%) | | 11.0/9.0 | 14.0/12.0 |
| Butyl acetate by solids content of the dispersing additive (100%/50%) | 10.8/6.6 | | |
| Total pigment content (%) | 12 | 16 | 10 |
| Dispersant (% s.o.p.) | 70 | 25 | 40 |

Grinding Conditions:
Equipment: Lau Disperser DAS 200
Dispersing time: 300 min, cooling power at level 3
Ratio of millbase to glass beads (diameter 1 mm): 1:1 (parts by weight)
Assessment of Millbase Viscosity of the TPA Dispersions
The millbase viscosity of the TPA dispersions was determined with a Rheological Stresstech Rheometer (plate/cone, 25 mm, 1°) at 23° C.
Millbase Viscosities

|  | TPA 1 (black) | | | TPA 2 (red) | | | TPA 3 (violet) | | |
|---|---|---|---|---|---|---|---|---|---|
|  | \multicolumn{9}{c}{Viscosity in mPa * s} | | | | | | | | |
|  | 1/s | 10/s | 100/s | 1/s | 10/s | 100/s | 1/s | 10/s | 100/s |
| MA56* | 45.890 | 7.727 | 1.828 | 15.370 | 2.876 | 0.814 | 42.110 | 4.786 | 1.085 |
| MA57* | 48.380 | 7.022 | 1.663 | 15.440 | 2.879 | 0.864 | 38.460 | 4.680 | 1.005 |
| MA58* | 51.610 | 7.534 | 1.774 | 22.470 | 3.808 | 1.011 | 57.960 | 7.762 | 1.432 |
| MA22 | 3.326 | 2.455 | 1.080 | 4.786 | 1.497 | 0.644 | 41.590 | 5.476 | 1.129 |
| MA59 | 15.180 | 2.409 | 0.834 | 3.727 | 0.942 | 0.431 | 24.370 | 3.621 | 0.732 |
| MA19 | 1.778 | 0.759 | 0.487 | 7.213 | 1.536 | 0.575 | 26.730 | 2.820 | 0.705 |

*not in accordance with the invention

The inventive dispersing additives MA19, MA22 and MA59 have a significant viscosity-reducing effect compared to the prior art MA56* to MA58* in TPA dispersions of 3 different pigments, which is manifested even at low shear rates.

Production of the TPA-Based Letdown System

Paraloid B-66, solvent and leveling additive were weighed into a 2.5 L PE bucket and homogenized with a Dispermat CV (65 mm toothed disk) at 2000 rpm for 5 min.

Composition of the TPA Letdown System (Figures in g)

| TPA clearcoat | Weight in g |
|---|---|
| Paraloid B-66 (50% in xylene) | 700 |
| DIDP | 20 |
| Xylene | 218 |
| PMA | 60 |
| BYK 306 | 2 |

Production of the Pigmented TPA Letdown Systems

The TPA letdown system and the TPA-based pigment dispersion were weighed into a PE cup and mixed by spatula. Subsequently, all the final TPA letdown systems were homogenized in an ANDALOK shaker for 10 min.

Composition of the Pigmented TPA Letdown Systems (Figures in g)

|  | TPA-B1 | TPA-B2 |
|---|---|---|
| TPA letdown system | 27.0 | 26.0 |
| TPA 1 (red) | 3.0 |  |
| TPA 2 (violet) |  | 4.0 |
| Pigment content (%) | 1.6 | 1.3 |

Application and Evaluation of the Pigmented TPA Letdown Systems

The pigmented TPA letdown systems were bar-coated onto PE film (50 μm or 100 μm) and dried at 22° C. for 24 h. Subsequently, the haze and gloss were measured with a BYK micro haze plus instrument at an angle of 20°. In each case, low values for haze and high values for gloss are considered to be positive results. In addition, the optical color intensity and transparency through the drawdowns onto PE film was assessed using grades 1 (excellent) to 5 (unacceptable).

| | TPA-B1 (red) | | |
|---|---|---|---|
| Dispersing additive in the millbase | Masstone 100 μm PE film Haze | Masstone 100 μm PE film Gloss 20° | Masstone 100 μm PE film Transparency/color intensity |
| MAQ5* | 87 | 60 | 5 |
| MA55* | 47 | 67 | 4 |

-continued

| MA58* | 20 | 73 | 4 |
| MA22 | 11 | 78 | 2 |
| MA59 | 18 | 77 | 1-2 |
| MA47 | 12 | 78 | 2 |

| | TPA-B2 (violet) | | |
|---|---|---|---|
| Dispersing additive in the millbase | Masstone 100 μm PE film Haze | Masstone 100 μm PE film Gloss 20° | Masstone 50 μm PE film Transparency/color intensity |
| MAQ5* | 131 | 52 | 5 |
| MA55* | 50 | 71 | 4 |
| MA22 | 38 | 74 | 3 |
| MA59 | 36 | 75 | 1-2 |
| MA47 | 45 | 72 | 3 |

*not in accordance with the invention

The inventive dispersing additives MA22, MA59 and MA47 exhibit lower haze, better gloss values and higher transparency and color intensity compared to the prior art MAQ5*, MA55* and MA58* for TPA-based varnish systems.

Production of the Laropal A81 Pigment Dispersion

The Laropal A81 dispersion resin (60 parts) was weighed into a 2.5 L PE bucket together with PMA (40 parts) and homogenized by means of a Dispermat CV (65 mm toothed disk) at 2000 rpm for 30 min. Subsequently, the solution of the dispersion resin, solvent, dispersing additive and pigment was weighed into 100 mL glass bottles so as to obtain 50 g of millbase. Subsequently, 50 g of glass beads (1 mm) were weighed in.

Composition of the Laropal A81 Pigment Concentrates (Figures in g)

|  | LA 1 (black) | LA 2 (pink) | LA 3 (blue) | LA 4 (red) |
|---|---|---|---|---|
| Laropal A 81 (60% in PMA) | 8.7 | 20.4 | 21.9 | 9.7 |
| Color Black FW 200 | 4.0 |  |  |  |
| Hostaperm Pink E |  | 7.0 |  |  |
| Heliogen Blue 7101F |  |  | 7.5 |  |
| Bayferrox Red 130M |  |  |  | 25.0 |

|  | LA 1 (black) | LA 2 (pink) | LA 3 (blue) | LA 4 (red) |
|---|---|---|---|---|
| Dispersing additive (100%/50%) | 2.8/5.6 | 1.8/3.6 | 1.9/3.8 | 2.5/5.0 |
| PMA | 34.6 | 20.9 | 18.8 | 12.8 |
| Total pigment content (%) | 8 | 14 | 15 | 50 |
| Dispersing additive (% s.o.p.) | 70 | 25 | 25 | 5 |

Grinding Conditions:

Equipment: Lau Disperser DAS 200

Grinding time: 300 min, cooling power at level 3

Ratio of millbase to glass beads (diameter 1 mm): 1:1 (parts by weight)

Assessment of the Millbase Viscosity and Turbidity of the Laropal A81 Dispersions The millbase viscosity of the Laropal A81 dispersions was determined with a Rheological Stresstech Rheometer (plate/cone, 25 mm, 1°) at 23° C.

Millbase Viscosities

|  | LA 1 (black) Viscosity in mPa * s | | | LA 2 (pink) Viscosity in mPa * s | | | LA 3 (blue) Viscosity in mPa * s | | |
|---|---|---|---|---|---|---|---|---|---|
|  | 1/s | 10/s | 100/s | 1/s | 10/s | 100/s | 1/s | 10/s | 100/s |
| MA54* | 44 | 13 | 10 | 34870 | 3934 | 794 | 9457 | 1017 | 214 |
| MA57* | 185 | 86 | 34 | 28460 | 3656 | 939 | 10450 | 1474 | 228 |
| MA58* | 232 | 25 | 9 | 33660 | 3399 | 995 | 10720 | 815 | 247 |
| MA22 | 27 | 19 | 15 | 20530 | 2716 | 491 | 5370 | 745 | 181 |
| MA59 | 60 | 10 | 7 | 6238 | 962 | 230 | 3413 | 537 | 142 |
| MA35 | 47 | 13 | 9 | 23100 | 2782 | 619 | 1345 | 379 | 96 |

*not in accordance with the invention

The inventive dispersing additives MA22, MA35 and MA59 have a significant viscosity-reducing effect compared to the prior art MA54*, MA57* and MA58* in Laropal A81 dispersions of 3 different pigments, which is manifested even at low shear rates.

Production of the Nitrocellulose-Based Clearcoat NC1

Binder, solvent and substrate wetting agent were weighed into a 2.5 L PE bucket and homogenized with a Dispermat CV (65 mm toothed disk) at 2000 rpm for 5 min.

Composition of the Nitrocellulose-Based Clearcoat NC1 (Figures in g)

| Nitrocellulose-based clearcoat NC1 | Weight in g |
|---|---|
| Vialkyd AC 433 75% | 167.0 |
| NC chips E 510 | 122.0 |
| DIBP | 8.0 |
| Ethyl acetate | 154.0 |
| Toluene | 154.0 |
| Isopropanol | 86.0 |
| Butyl acetate | 267.0 |
| Xylene | 40.0 |
| BYK-306 | 2.0 |

Production of the Baking Varnish JC1

Binder, solvent and substrate wetting agent were weighed into a 2.5 L PE bucket and homogenized with a Dispermat CV (65 mm toothed disk) at 2000 rpm for 5 min.

Composition of the Baking Varnish JC1 (Figures in g)

| Baking varnish JC1 | Weight in g |
|---|---|
| Joncryl 500 | 576.0 |
| Cymel 303 | 198.0 |
| Butanol | 80.0 |
| MAK | 130.0 |
| BYK-310 | 3.0 |
| Nacure 2500 | 13.0 |

Production of the 2-Component Epoxy Varnish 2KE1

The epoxy component and the amine component of the 2-component varnish are weighed out separately in a 2.5 L PE bucket and in an 800 mL PE beaker respectively, and homogenized with a Dispermat CV (65 mm toothed disk) at 2000 rpm for 5 min.

Composition of the 2-Component Epoxy Varnish 2KE1 (Figures in g)

| 2-component epoxy varnish 2KE1 | Weight in g |
|---|---|
| Epoxy component | |
| Epikote 1001 75% | 600.0 |
| Xylene | 170.0 |
| Dowanol PM | 128.0 |
| Butanol | 100.0 |
| BYK-325 | 2.0 |
| Amine component | |
| Aradur 115 X 70 | 355.0 |
| Xylene | 60.0 |
| Dowanol PM | 40.0 |
| Butanol | 45.0 |

Production of Various Varnishes Based on the Laropal A81 Pigment Dispersions

The Laropal A81-based pigment dispersions and the respective clearcoats were weighed into a PE cup and mixed by hand with a spatula. In the case of the 2-component epoxy varnish, the pigment dispersion was incorporated into the epoxy component prior to the amine component. Subsequently, all pigmented varnishes were homogenized in an ANDALOK shaker for 10 min.

Composition of the Pigmented NC1-B3 (Blue) Letdown System (Figures in g)

|  | NC1-B3 (blue) |
|---|---|
| NC1 | 16.0 |
| LA 3 (blue) | 4.0 |
| Pigment content (%) | 3.0 |

Composition of the Pigmented JC1 Letdown Systems (Figures in g)

|  | JC1-B1 (black) | JC1-B2 (pink) | JC1-B3 (blue) |
|---|---|---|---|
| JC1 | 18.0 | 17.9 | 16.0 |
| LA 1 (black) | 2.0 |  |  |
| LA 2 (pink) |  | 2.1 |  |
| LA 3 (blue) |  |  | 4.0 |
| Pigment content (%) | 0.8 | 1.5 | 3.0 |

Composition of the Pigmented 2KE1 Letdown Systems (Figures in g)

|  | 2KE1-B1 (black) | 2KE1-B4 (red) |
| --- | --- | --- |
| 2KE1 epoxy component | 12.0 | 12.5 |
| LA 1 (black) | 2.0 |  |
| LA 4 (red) |  | 1.2 |
| 2KE1 amine component | 6.0 | 6.3 |
| Pigment content (%) | 0.8 | 3.0 |

Application and Evaluation of the Pigmented Nitrocellulose Varnish NC1-B3 (Blue)

The pigmented nitrocellulose varnish NC1-B3 (blue) was bar-coated onto PE film (50 μm) and dried at 22° C. for 24 h. Then the optical transparency and color intensity through the drawdowns onto PE film was assessed using grades 1 (excellent) to 5 (unacceptable). The colorimetric assessment of the drawdowns was conducted with a BYK-Gardner color guide D65/10° in the CIELab color space (L, a, b).

| L 100 = white | −a = greenish | −b = bluish |
| --- | --- | --- |
| L 0 = black | +a = reddish | +b = yellowish |

Comparison of the NC-Based Blue Drawdowns NC1-B3 (Blue)

| Synthesis name | Transparency/ color intensity | L | a | b |
| --- | --- | --- | --- | --- |
| MAQ5* | 5 | 41.0 | −33.5 | −42.7 |
| MA54* | 2.5 | 37.4 | −30.0 | −42.3 |
| MA56* | 2.5 | 36.8 | −29.6 | −42.1 |
| MA57* | 3 | 36.8 | −29.6 | −42.0 |
| MA58* | 3 | 36.7 | −29.5 | −42.0 |
| MA22 | 1.5 | 37.3 | −28.3 | −42.8 |
| MA59 | 1 | 37.6 | −28.4 | −43.1 |
| MA47 | 1.5 | 36.3 | −28.4 | −42.8 |

It should be particularly emphasized here that smaller a values in terms of magnitude indicate better dispersion of the blue pigment, and negative b values that are larger in terms of magnitude point to a deeper blue impression. This trend is shown by inventive examples MA22, MA59 and MA47 compared to the prior art.

Application and Evaluation of the Pigmented Baking Varnishes JC1-B1 to JC1-B3

The pigmented baking varnishes JC1-B1 to JC1-B3 were bar-coated onto PE film (50 μm), flashed off at 22° C. for 15 min and baked at 150° C. for 20 min. Subsequently, haze and gloss were measured with a BYK micro haze plus instrument at an angle of 20°. In each case, low values for haze and high values for gloss are considered to be positive results. In addition, the optical transparency and color intensity through the drawdowns onto PE film was assessed using grades 1 (excellent) to 5 (unacceptable).

Comparison of the Black Baking Varnishes JC1-B1 (Black)

| Synthesis name | Gloss 20° | Haze | Transparency/ color intensity |
| --- | --- | --- | --- |
| MAQ5* | 105 | 14 | 3 |
| MA54* | 106 | 11 | 4 |
| MA55* | 106 | 12 | 2 |
| MA56* | 105 | 10 | 5 |
| MA57* | 103 | 24 | 3.5 |
| MA22 | 106 | 10 | 1 |
| MA59 | 105 | 14 | 1 |
| MA19 | 106 | 10 | 1 |
| MA47 | 106 | 10 | 1 |
| MA35 | 106 | 10 | 1 |

Comparison of the Pink Baking Varnishes JC1-B2 (Pink)

| Synthesis name | Gloss 20° | Transparency/ color intensity |
| --- | --- | --- |
| MAQ5* | 111 | 5 |
| MA55* | 113 | 4 |
| MA57* | 113 | 4 |
| MA58* | 113 | 4 |
| MA22 | 114 | 3 |
| MA59 | 117 | 1.5 |
| MA35 | 114 | 3 |

Comparison of the Blue Baking Varnishes JC1-B3 (Blue)

| Synthesis name | Gloss 20° | Haze | Transparency/ color intensity |
| --- | --- | --- | --- |
| MAQ5* | 107 | 31 | 3.5 |
| MA54* | 115 | 21 | 4 |
| MA56* | 115 | 21 | 4 |
| MA57* | 112 | 38 | 3 |
| MA58* | 114 | 27 | 3.5 |
| MA22 | 119 | 16 | 2 |
| MA59 | 118 | 18 | 1 |
| MA47 | 117 | 18 | 2 |

Application and Evaluation of the Pigmented 2-Component Epoxy Varnishes 2KE1-B1 (Black) and 2KE1-B4 (Red)

The pigmented 2-component epoxy varnish 2KE1-B1 was bar-coated onto PE film (50 μm) and dried at 22° C. for 24 h. The formulation 2KE1-B4 was poured onto a PE film and then likewise dried at 22° C. for 24 h. Subsequently, haze and gloss were measured with a BYK micro haze plus instrument at an angle of 20°. In each case, low values for haze and high values for gloss are considered to be positive results. In addition, the optical transparency and color intensity through the drawdowns onto PE film was assessed using grades 1 (excellent) to 5 (unacceptable).

Comparison of the Black 2-Component Epoxy Varnishes 2KE1-B1 (Black)

| Synthesis name | Gloss 20° | Haze | Transparency/ color intensity |
| --- | --- | --- | --- |
| MA54* | 101 | 13.8 | 4 |
| MA55* | 102 | 10 | 3.5 |
| MA56* | 101 | 10.9 | 3 |
| MA57* | 100 | 12.6 | 3 |
| MA58* | 100 | 13 | 3 |
| MA22 | 104 | 12.6 | 2 |
| MA59 | 106 | 10 | 2 |
| MA19 | 102 | 10 | 2 |

Comparison of the Red 2-Component Epoxy Varnishes 2KE1-B4 (Red)

| Synthesis name | Gloss 20° | Haze | Transparency/ color intensity |
|---|---|---|---|
| MAQ5* | 101 | 15.2 | 3 |
| MA54* | 101 | 16.4 | 3.5 |
| MA55* | 101 | 11.9 | 4 |
| MA57* | 100 | 19.6 | 3 |
| MA22 | 102 | 10 | 2.5 |
| MA59 | 101 | 13.8 | 2.5 |
| MA19 | 101 | 15.2 | 2 |
| MA35 | 102 | 10 | 3 |

Use Example for the Dispersing Additives of the Invention in Polyester Baking Varnishes with Organic and Inorganic Pigments Production of the Red Pigment Concentrates PKR1 to PKR5

The components of the pigment concentrates PKR1 to PKR5 based on the inorganic red pigment BAYFERROX red 130M were each weighed into a PE cup and dispersed by means of a Dispermat CV with a toothed disk at a peripheral speed of 18 m/s at 40° C. for 30 min.

Composition of the Red Pigment Concentrates

|  | PKR1 | PKR2 | PKR3 | PKR4 | PKR5 |
|---|---|---|---|---|---|
| Dynapol LH 830 (60%) | 20.0 | 20.0 | 20.0 | 20.0 | 20.0 |
| Methoxypropyl acetate | 3.5 | 7.2 | 7.2 | 7.2 | 7.2 |
| DISPERBYK-170* (30%) | 15.0 | | | | |
| MAS6 (40%) | | 11.3 | | | |
| MAS8 (40%) | | | 11.3 | | |
| MAS9 (40%) | | | | 11.3 | |
| MAQ5* (40%) | | | | | 11.3 |
| Starsol (DBE) | 1.0 | 1.0 | 1.0 | 1.0 | 1.0 |
| Aerosil R972 | 0.5 | 0.5 | 0.5 | 0.5 | 0.5 |
| Bayferrox red 130M | 60.0 | 60.0 | 60.0 | 60.0 | 60.0 |
|  | 100.0 | 100.0 | 100.0 | 100.0 | 100.0 |

Production of the Green Pigment Concentrates PKG1 to PKG5

The components of the pigment concentrates PKG1 to PKG5 based on Heliogen Green L8735 were each weighed into a PE cup and dispersed by means of a Dispermat CV with a toothed disk at a peripheral speed of 23 m/s at 40° C. for 40 min.

Composition of the Green Pigment Concentrates

|  | PKG1 | PKG2 | PKG3 | PKG4 | PKG5 |
|---|---|---|---|---|---|
| Dynapol LH 830 (60%) | 56.0 | 56.0 | 56.0 | 56.0 | 56.0 |
| Methoxypropyl acetate | 5.0 | 7.6 | 7.6 | 7.6 | 7.6 |
| DISPERBYK-170* (30%) | 10.4 | | | | |
| MAS6 (40%) | | 7.8 | | | |
| MAS8 (40%) | | | 7.8 | | |
| MAS9 (40%) | | | | 7.8 | |
| MAQ5* (40%) | | | | | 7.8 |
| Starsol (DBE) | 13.0 | 13.0 | 13.0 | 13.0 | 13.0 |
| Heliogen Green L8735 | 15.6 | 15.6 | 15.6 | 15.6 | 15.6 |
|  | 100.0 | 100.0 | 100.0 | 100.0 | 100.0 |

Production of the Black Pigment Concentrates PKS1 to PKS5

The components of the pigment concentrates PKS1 to PKS5 based on Special black 100 were each weighed into a PE cup and dispersed by means of a Dispermat CV with a toothed disk at a peripheral speed of 23 m/s at 40° C. for 60 min. Subsequently, the black pigment dispersions were homogenized with 11.7 g of Dynapol LH 830 (60%) and 5.0 g of butyldiglycol acetate to give the finished pigment concentrates.

Composition of the Black Pigment Concentrates

|  | PKS1 | PKS2 | PKS3 | PKS4 | PKS5 |
|---|---|---|---|---|---|
| Dynapol LH 830 (60%) | 44.1 | 44.1 | 44.1 | 44.1 | 44.1 |
| Methoxypropyl acetate | 5.0 | 8.0 | 8.0 | 8.0 | 8.0 |
| DISPERBYK-170* (30%) | 12.0 | | | | |
| MAS6 (40%) | | 9.0 | | | |
| MAS8 (40%) | | | 9.0 | | |
| MAS9 (40%) | | | | 9.0 | |
| MAQ5* (40%) | | | | | 9.0 |
| Starsol (DBE) | 10.2 | 10.2 | 10.2 | 10.2 | 10.2 |
| Special black 100 | 12.0 | 12.0 | 12.0 | 12.0 | 12.0 |
| Dispersion: Dispermat CV, 23 m/s, 60 minutes, 40° C. | | | | | |
| Dynapol LH 830 (60%) | 11.7 | 11.7 | 11.7 | 11.7 | 11.7 |
| butyldiglycol acetate | 5.0 | 5.0 | 5.0 | 5.0 | 5.0 |
|  | 100.0 | 100.0 | 100.0 | 100.0 | 100.0 |

Measurement of Viscosity of the Pigment Concentrates

The pigment concentrates were analyzed by means of a rotary viscometer (Stress Tech Instrument, cone-plate geometry, cone diameter 2.5 cm, cone angle 1°, temperature 21° C.) at various shear rates ($1\ s^{-1}$, $10\ s^{-1}$, $100\ s^{-1}$).

Measurement of Viscosity of Pigment Concentrates PKR1 to PKR5 Based on Bayferrox Red 130M

|  | Viscosity [Pa · s] at $1\ s^{-1}$ | Viscosity [Pa · s] at $10\ s^{-1}$ | Viscosity [Pa · s] at $100\ s^{-1}$ |
|---|---|---|---|
| PKR1 (DISPERBYK-170*) | 21.02 | 4.98 | 3.86 |
| PKR2 (MAS6) | 15.77 | 4.21 | 3.22 |
| PKR3 (MAS8) | 10.70 | 3.11 | 1.68 |
| PKR4 (MAS9) | 11.81 | 3.61 | 2.13 |
| PKR5 (MAQ5*) | 19.39 | 4.77 | 3.71 |

Measurement of Viscosity of Pigment Concentrates PKG1 to PKG5 Based on Heliogen Green L8735

|  | Viscosity [Pa · s] at $1\ s^{-1}$ | Viscosity [Pa · s] at $10\ s^{-1}$ | Viscosity [Pa · s] at $100\ s^{-1}$ |
|---|---|---|---|
| PKG1 (DISPERBYK-170*) | 14.72 | 3.03 | 1.21 |
| PKG2 (MAS6) | 9.23 | 2.47 | 1.11 |
| PKG3 (MAS8) | 7.65 | 2.19 | 0.97 |
| PKG4 (MAS9) | 11.54 | 2.89 | 1.19 |
| PKG5 (MAQ5*) | 18.21 | 4.84 | 1.76 |

Measurement of Viscosity of Pigment Concentrates PKS1 to PKS5 Based on Special Black 100

|  | Viscosity [Pa · s] at $1\ s^{-1}$ | Viscosity [Pa · s] at $10\ s^{-1}$ | Viscosity [Pa · s] at $100\ s^{-1}$ |
|---|---|---|---|
| PKS1 (DISPERBYK-170*) | 1.36 | 0.74 | 0.59 |
| PKS2 (MAS6) | 1.08 | 0.54 | 0.46 |
| PKS3 (MAS8) | 0.71 | 0.51 | 0.42 |
| PKS4 (MAS9) | 0.88 | 0.52 | 0.45 |
| PKS5 (MAQ5*) | 1.29 | 0.73 | 0.60 |

Production of the White Drawdown Systems ASW1 to ASW5

For the letdown of the pigment concentrates PKR1 to PKR5, PKG1 to PKG5 and PKS1 to PKS5 produced, a formulation based on DYNAPOL LH 830 as white base pigmented with Tiona 696 was chosen.

The components of letdown system part 1 were each weighed into large PE beakers and dispersed by means of a Dispermat CV with a toothed disk at a peripheral speed of 18 m/s at 40° C. for 20 min. Subsequently, the white dispersions were homogenized with the part 2 components to give the finished letdown systems.

TABLE 1

Letdown system (DYNAPOL LH 830/CYMEL 303 white base)

|  | ASW1 | ASW2 | ASW3 | ASW4 | ASW5 |
|---|---|---|---|---|---|
| Part 1 | | | | | |
| Dynapol LH 830 (60%) | 132.0 | 132.0 | 132.0 | 132.0 | 132.0 |
| Methoxypropyl acetate | 18.8 | 20.3 | 20.3 | 20.3 | 20.3 |
| DISPERBYK-170* (30%) | 6.0 | | | | |
| MAS6 (40%) | | 4.5 | | | |
| MAS8 (40%) | | | 4.5 | | |
| MAS9 (40%) | | | | 4.5 | |
| MAQ5* (40%) | | | | | 4.5 |
| Aerosil R972 | 1.2 | 1.2 | 1.2 | 1.2 | 1.2 |
| Tiona 696 | 120.0 | 120.0 | 120.0 | 120.0 | 120.0 |
| Dispersion: Dispermat CV, 18 m/s, 20 minutes, 40° C. | | | | | |
| Part 2 | | | | | |
| Dynapol LH 830 (60%) | 68.0 | 68.0 | 68.0 | 68.0 | 68.0 |
| Cymel 303 (>98%) | 30.0 | 30.0 | 30.0 | 30.0 | 30.0 |
| Dynapol 1203 (50%) | 15.2 | 15.2 | 15.2 | 15.2 | 15.2 |
| BYK-358N | 2.0 | 2.0 | 2.0 | 2.0 | 2.0 |
| BYK-057 | 0.8 | 0.8 | 0.8 | 0.8 | 0.8 |
| Solvesso 150ND | 6.0 | 6.0 | 6.0 | 6.0 | 6.0 |
| | 400.0 | 400.0 | 400.0 | 400.0 | 400.0 |

Production of the Final Test Formulations Based on Dynapol LH 830

The pigment concentrates PKR1, PKG1 and PKS1 were each formulated with the corresponding white base ASW1 using the same dispersing additive. The final test systems TSRW1 (PKR1+ASW1), TSGW1 (PKG1+ASW1) and TSSW1 (PKS1+ASW1) contain, for example, DISPERBYK-170 only as prior art dispersing additive. The same applies analogously to the other inventive examples in the table below.

Naming of the Test Formulations Based on Dynapol LH 830

| Test system | based on white base | and pigment concentrate |
|---|---|---|
| TSRW1 | ASW1 | PKR1 |
| TSGW1 | ASW1 | PKG1 |
| TSSW1 | ASW1 | PKS1 |
| TSRW2 | ASW2 | PKR2 |
| TSGW2 | ASW2 | PKG2 |
| TSSW2 | ASW2 | PKS2 |
| TSRW3 | ASW3 | PKR3 |
| TSGW3 | ASW3 | PKG3 |
| TSSW3 | ASW3 | PKS3 |
| TSRW4 | ASW4 | PKR4 |
| TSGW4 | ASW4 | PKG4 |
| TSSW4 | ASW4 | PKS4 |
| TSRW5 | ASW5 | PKR5 |
| TSGW5 | ASW5 | PKG5 |
| TSSW5 | ASW5 | PKS5 |

Formulation of the Test Systems Based on DISPERBYK 170 (Analogously for all Other Additives

|  | TSRW1 | TSGW1 | TSSW1 |
|---|---|---|---|
| ASW1 white base | 50.0 | 54.2 | 53.0 |
| PKR1 pigment concentrate (based on Bayferrox red 130M) | 10.0 | | |
| PKG1 pigment concentrate (based on Heliogen Green L8735) | | 5.8 | |
| PKS1 pigment concentrate (based on Special black 100) | | | 7.0 |
| | 60.0 | 60.0 | 60.0 |

The final test systems are formulated by weighing white base and pigment concentrate in each case together into a sealable vessel. The mixture is homogenized in a Skandex shaker for ten minutes. Subsequently, the varnishes are applied to aluminum sheet by means of a spiral coating bar in a wet film layer thickness of 80 μm. In a coil oven, the varnishes are baked at 320° C. for 33 seconds with peak metal temperature 232° C. A dry layer thickness of about 18 μm is achieved.

A rubout test is also conducted in order to determine the difference in shade (ΔE) between rubbed and unrubbed surface within the rub. For this purpose, a portion of the final test systems that have been homogenized on the Skandex shaker are applied again to aluminum sheet by means of a spiral coating bar in a wet film layer thickness of 80 μm. Subsequently, a portion of the varnish applied is rubbed (sheared) in horizontal direction in each case using a finger. Subsequently, the varnishes are baked in a coil oven at 320° C. for 33 seconds with peak metal temperature 232° C. After cooling, the difference in shade (ΔE) between rubbed (sheared) and unrubbed surface is measured by means of colorimetry with a BYK spectro-guide sphere. A small difference in shade ΔE indicates that both pigments (white and the respective shade) in each case are equally stabilized and no floating is observed.

Difference in Shade (ΔE) of the Final Test Systems (Rubout Test)

|  | ΔE TSRW1-5 Bayferrox red 130M | ΔE TSGW1-5 Heliogen Green L8735 | ΔE TSSW1-5 Special black 100 |
|---|---|---|---|
| DISPERBYK-170* (30%) | 3.6 | 0.9 | 1.4 |
| MAS6 (40%) | 1.8 | 0.5 | 1.1 |
| MAS8 (40%) | 1.5 | 0.7 | 0.9 |
| MAS9 (40%) | 1.4 | 0.7 | 0.8 |
| MAQ5* (40%) | 4.0 | 0.9 | 2.5 |

Measurement of Gloss in the Final Test Systems

For the test systems that have been applied to aluminum sheets and baked under coil conditions, gloss is measured at an angle of 20° with a BYK micro haze plus.

Measurement of Gloss of the Final Test Systems at a 20° Angle

|  | TSRW1-5 Bayferrox red 130M | TSGW1-5 Heliogen Green L8735 | TSSW1-5 Special black 100 |
|---|---|---|---|
| DISPERBYK-170* (30%) | 55 | 79 | 80 |
| MAS6 (40%) | 76 | 84 | 86 |
| MAS8 (40%) | 75 | 92 | 85 |

-continued

|  | TSRW1-5<br>Bayferrox<br>red 130M | TSGW1-5<br>Heliogen<br>Green L8735 | TSSW1-5<br>Special<br>black 100 |
|---|---|---|---|
| MAS9 (40%) | 72 | 88 | 86 |
| MAQ5* (40%) | 65 | 66 | 80 |

The invention claimed is:

1. A reaction product containing urethane and urea groups, comprising at least one species of the general formula (I)

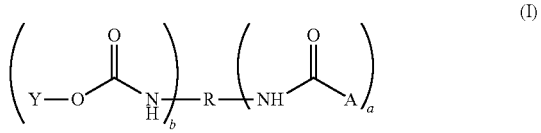

where a is an integer and is 1 or 2,
b is an integer and is 1 or 2,
x is an integer and is 2 or 3,
and
R is the organic radical of a corresponding polyisocyanate $R(NCO)_x$, R is a branched or unbranched, saturated or unsaturated organic radical having 1 to 150 carbon atoms and does not contain any free isocyanate groups,
the Y radical(s) is/are independently the organic radical(s) of a corresponding alcohol $Y(OH)_q$ where q is an integer and is 1 and Y is a branched or unbranched, saturated or unsaturated organic radical having 1 to 1000 carbon atoms, wherein the Y radicals are selected from the group consisting of polyether radical based on ethylene oxide, propylene oxide, and mixtures thereof, and having a number-average molecular weight of 200 to 10,000 g/mol, polyester radical obtained by polycondensation of one or more optionally alkyl-substituted hydroxycarboxylic acids or ring-opening polymerization of the corresponding lactones, and having number average molecular weight Mn in the range of 150 to 5,000 g/mol, and hydrocarbyl radical, wherein the hydrocarbyl radical is the hydrocarbyl group of at least one of methanol, ethanol, butanol, ethylhexanol, decanol, isotridecyl alcohol, lauryl alcohol, stearyl alcohol, isobornyl alcohol, benzyl alcohol, propargyl alcohol, oleyl alcohol, linoleyl alcohol, oxo alcohols, neopentyl alcohol, cyclohexanol, fatty alcohols, alkylphenols, alkylnaphthols, and phenylethanol,
the A radical(s) is/are independently a radical of the general formula (II)

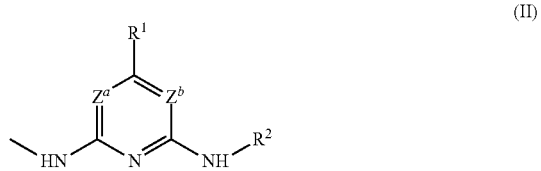

where
the $R^1$ radical is H or a branched or unbranched, saturated or unsaturated organic radical having 1 to 25 carbon atoms, the $Z^a$ group is N,
the $Z^b$ group is N or CH, and
the $R^2$ radical is H.

2. The reaction product containing urethane and urea groups as claimed in claim 1, containing at least 40% by weight of one or more species of the general formula (I).

3. The reaction product containing urethane and urea groups as claimed in claim 1, wherein a is 1 and b is 1.

4. The reaction product containing urethane and urea groups as claimed in claim 1, wherein the $R^1$ radical is phenyl.

5. A process for preparing a reaction product containing urethane and urea groups as claimed in claim 1, wherein
i) b alcohols $Y—(OH)_q$ are reacted with at least one polyisocyanate $R(NCO)_x$ to form at least one urethane of the general formula (V)

$$((HO)_{q-1}—Y—O—CO—NH)_b—R—(NCO)_{x-b} \quad (V)$$

where
the urethane of the general formula (V) contains at least one free isocyanate group,
and
ii) at least one urethane of the general formula (V) is reacted with a species of the general formula (IIa)

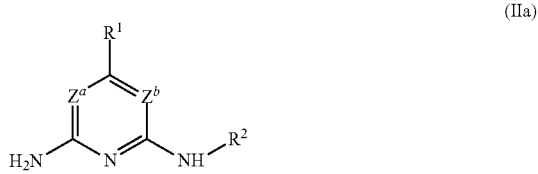

to give a reaction product containing urethane and urea groups, comprising at least one species of the general formula (I)

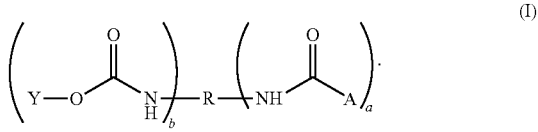

6. A wetting agent and dispersant comprising a reaction product containing urethane and urea groups as claimed in claim 1.

7. An adhesion promoter comprising a reaction product containing urethane and urea groups as claimed in claim 1.

8. A composition comprising a reaction product containing urethane and urea groups as claimed in claim 1.

9. The composition according to claim 8, wherein the composition further comprises at least one of pigment and filler.

10. A reaction product containing urethane and urea groups as claimed in claim 1 as an additive, wetting agent, dispersant, dispersion stabilizer, adhesion promoter, viscosity reducer, or compatibilizer in coatings, varnishes, plastics, pigment pastes, sealants, cosmetics, ceramics, adhesives, potting compounds, spackling compounds, printing inks and inks other than printing inks.

11. A reaction product containing urethane and urea groups, comprising one or more salt(s) and/or one or more quaternization product(s) of the species of the general formula (I) as claimed in claim 1.

* * * * *